US012289689B2

(12) United States Patent
Khoshnevisan et al.

(10) Patent No.: US 12,289,689 B2
(45) Date of Patent: *Apr. 29, 2025

(54) PATHLOSS REFERENCE SIGNAL UPDATE FOR MULTIPLE BEAMS

(71) Applicant: QUALCOMM Incorporated, San Diego, CA (US)

(72) Inventors: Mostafa Khoshnevisan, San Diego, CA (US); Yitao Chen, San Marcos, CA (US); Xiaoxia Zhang, San Diego, CA (US); Tao Luo, San Diego, CA (US); Fang Yuan, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/426,120

(22) Filed: Jan. 29, 2024

(65) Prior Publication Data

US 2024/0172124 A1 May 23, 2024

Related U.S. Application Data

(63) Continuation of application No. 17/823,436, filed on Aug. 30, 2022, now Pat. No. 11,985,604, which is a
(Continued)

(51) Int. Cl.
*H04W 52/14* (2009.01)
*H04W 52/54* (2009.01)

(52) U.S. Cl.
CPC ......... *H04W 52/146* (2013.01); *H04W 52/54* (2013.01)

(58) Field of Classification Search
CPC .. H04W 52/146; H04W 52/54; H04L 5/0048; H04L 5/001
See application file for complete search history.

(56) References Cited

U.S. PATENT DOCUMENTS

| 11,438,847 B2 | 9/2022 | Liu et al. |
| 2019/0053166 A1 | 2/2019 | Nagaraja et al. |

(Continued)

FOREIGN PATENT DOCUMENTS

| CN | 110536440 A | 12/2019 |
| CN | 110710281 A | 1/2020 |

(Continued)

OTHER PUBLICATIONS

Supplementary European Search Report—EP20945558—Search Authority—The Hague—Mar. 14, 2024 (206183EP).
(Continued)

*Primary Examiner* — John J Lee
(74) *Attorney, Agent, or Firm* — Holland & Hart LLP

(57) ABSTRACT

Methods, systems, and devices for wireless communications are described. A user equipment (UE) may receive a first control message indicating an uplink power control configuration for the UE. The uplink power control configuration may be associated with a power control identifier and a resource set identifier. The UE may receive a second control message that schedules an uplink message for the UE. The second control message may indicate the resource set identifier and the power control identifier for transmission of the uplink message. The UE may determine a transmit power for the uplink message based on a set of power control parameters, the set of power control parameters corresponding to the resource set identifier and the power control identifier. The UE may transmit the uplink message using a resource set associated with the resource set identifier and in accordance with the determined transmit power.

28 Claims, 17 Drawing Sheets

Related U.S. Application Data continuation of application No. PCT/CN2020/102180, filed on Jul. 15, 2020.

(56) References Cited

U.S. PATENT DOCUMENTS

| | | |
|---|---|---|
| 2019/0074882 A1 | 3/2019 | Zhou et al. |
| 2019/0349864 A1 | 11/2019 | Zhang et al. |
| 2020/0305088 A1* | 9/2020 | Nory ............... H04B 7/0626 |
| 2020/0404593 A1* | 12/2020 | Yao ................. H04W 52/54 |
| 2021/0219275 A1* | 7/2021 | Xu .................. H04L 5/0051 |
| 2022/0116888 A1 | 4/2022 | Si et al. |
| 2023/0061877 A1 | 3/2023 | Khoshnevisan et al. |
| 2023/0239806 A1 | 7/2023 | Määttänen et al. |

FOREIGN PATENT DOCUMENTS

| | | |
|---|---|---|
| CN | 110831135 A | 2/2020 |
| CN | 111194569 A | 5/2020 |
| WO | 2019049107 A1 | 3/2019 |
| WO | 2019096317 A1 | 5/2019 |
| WO | WO-2019159002 A1 | 8/2019 |
| WO | WO-2020030144 A1 | 2/2020 |
| WO | 2021012586 A1 | 1/2021 |

OTHER PUBLICATIONS

Huawei, et al., "General Considerations on UL Power Control Design", 3GPP TSG RAN WG1 Meeting NR#3, R1-1715478, Nagoya, Japan, Sep. 18-21, 2017 (Sep. 21, 2017), 8 pages, the whole document.

International Preliminary Report on Patentability—PCT/CN2020/102180—The International Bureau of WIPO—Geneva, Switzerland—Jan. 26, 2023 (206183WO1).

International Search Report and Written Opinion—PCT/CN2020/102180—ISA/EPO—Apr. 1, 2021 (206183WO1).

Samsung: "Remaining Issues on the MAC CEs For Beam Enhancements", 3GPP TSG-RAN WG2 Meeting #110, R2-2004832, Electronic Online, Jun. 1-12, 2020, 6 Pages.

* cited by examiner

PATHLOSS REFERENCE SIGNAL UPDATE FOR MULTIPLE BEAMS

CROSS REFERENCE

The present application for patent is a continuation of U.S. patent application Ser. No. 17/823,436 by KHOSHNEVISAN, et al., entitled "PATHLOSS REFERENCE SIGNAL UPDATE FOR MULTIPLE BEAMS," filed Aug. 30, 2022, which is a continuation of PCT International Patent Application No. PCT/CN2020/102180 by KHOSHNEVISAN, et al., entitled "PATHLOSS REFERENCE SIGNAL UPDATE FOR MULTIPLE BEAMS," filed Jul. 15, 2020, each of which is assigned to the assignee hereof, and each of which is expressly incorporated by reference in its entirety herein.

FIELD OF TECHNOLOGY

The following relates to wireless communications, including pathloss reference signal update for multiple beams.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may be configured to transmit multiple uplink messages to one or more base stations. In some cases, a UE may be configured to transmit a first uplink message and a second uplink message on a beam. Current techniques for transmitting multiple uplink messages on a beam may fail to support flexible transmission parameters.

SUMMARY

The described techniques relate to improved methods, systems, devices, and apparatuses that support pathloss reference signal update for multiple beams. Generally, the described techniques provide for reducing latency by configuring power control parameters for a resource set. For example, a user equipment (UE) may communicate with one or more base stations using multiple resource sets (e.g., multiple beams, multiple links, etc.). The UE may transmit a first uplink message using a first resource set and in accordance with a first transmit power and a second uplink message using a second resource set and in accordance with a second transmit power.

For example, a UE may receive a first control message indicating an uplink power control configuration for the UE. The uplink power control configuration may be associated with a power control identifier and a resource set identifier. The UE may receive a second control message that schedules an uplink message for the UE. The second control message may indicate the resource set identifier and the power control identifier for transmission of the uplink message. The UE may determine a transmit power for the uplink message based on a set of power control parameters, the set of power control parameters corresponding to the resource set identifier and the power control identifier. The UE may transmit the uplink message using a resource set associated with the resource set identifier and in accordance with the determined transmit power.

A method of wireless communication at a UE is described. The method may include receiving a first control message indicating a set of uplink power control configurations for the UE, each uplink power control configuration associated with a power control identifier and a resource set identifier, receiving a second control message that schedules an uplink message for the UE, the second control message indicating the resource set identifier and the power control identifier for transmission of the uplink message, determining a transmit power for the uplink message based on a set of power control parameters, the set of power control parameters corresponding to the resource set identifier and the power control identifier, and transmitting the uplink message using a resource set associated with the resource set identifier and in accordance with the determined transmit power.

An apparatus for wireless communication at a UE is described. The apparatus may include a processor, memory coupled with the processor, and instructions stored in the memory. The instructions may be executable by the processor to cause the apparatus to receive a first control message indicating a set of uplink power control configurations for the UE, each uplink power control configuration associated with a power control identifier and a resource set identifier, receive a second control message that schedules an uplink message for the UE, the second control message indicating the resource set identifier and the power control identifier for transmission of the uplink message, determine a transmit power for the uplink message based on a set of power control parameters, the set of power control parameters corresponding to the resource set identifier and the power control identifier, and transmit the uplink message using a resource set associated with the resource set identifier and in accordance with the determined transmit power.

Another apparatus for wireless communication at a UE is described. The apparatus may include means for receiving a first control message indicating a set of uplink power control configurations for the UE, each uplink power control configuration associated with a power control identifier and a resource set identifier, receiving a second control message that schedules an uplink message for the UE, the second control message indicating the resource set identifier and the power control identifier for transmission of the uplink message, determining a transmit power for the uplink message based on a set of power control parameters, the set of power control parameters corresponding to the resource set identifier and the power control identifier, and transmitting the uplink message using a resource set associated with the resource set identifier and in accordance with the determined transmit power.

A non-transitory computer-readable medium storing code for wireless communication at a UE is described. The code may include instructions executable by a processor to receive a first control message indicating a set of uplink power control configurations for the UE, each uplink power control configuration associated with a power control identifier and a resource set identifier, receive a second control message that schedules an uplink message for the UE, the second control message indicating the resource set identifier and the power control identifier for transmission of the uplink message, determine a transmit power for the uplink message based on a set of power control parameters, the set of power control parameters corresponding to the resource set identifier and the power control identifier, and transmit the uplink message using a resource set associated with the resource set identifier and in accordance with the determined transmit power.

Some examples of the method, apparatuses, and non-transitory computer-readable medium described herein may further include operations, features, means, or instructions for receiving an indication of a second uplink power control configuration for the UE, the second uplink power control configuration associated with a second power control identifier and a second resource set identifier different from the resource set identifier, identifying a second uplink message for transmission by the UE based on the second control message, the second uplink message associated with the second resource set identifier and the second power control identifier, determining a second transmit power for the second uplink message based on a second set of power control parameters, the second set of power control parameters corresponding to the second resource set identifier and the second power control identifier, and transmitting the second uplink message using a second resource set associated with the second resource set identifier and in accordance with the determined second transmit power.

Some examples of the method, apparatuses, and non-transitory computer-readable medium described herein may further include operations, features, means, or instructions for receiving an update message including the resource set identifier, the power control identifier, and a reference signal parameter for an update in the uplink power control configuration, updating the uplink power control configuration corresponding to the resource set identifier and the power control identifier with the reference signal parameter, and transmitting, after updating the uplink power control configuration, the uplink message based on the reference signal parameter.

Some examples of the method, apparatuses, and non-transitory computer-readable medium described herein may further include operations, features, means, or instructions for determining that an additional reference signal field may be present in the update message based on an indicator in the update message, updating the second uplink power control configuration corresponding to the second resource set identifier and the power control identifier with a second reference signal parameter based on the additional reference signal field, and transmitting, after updating the second uplink power control configuration, with the second uplink message based on the second reference signal parameter.

In some examples of the method, apparatuses, and non-transitory computer-readable medium described herein, determining the transmit power may include operations, features, means, or instructions for determining the second transmit power based on the second reference signal parameter.

In some examples of the method, apparatuses, and non-transitory computer-readable medium described herein, determining the transmit power may include operations, features, means, or instructions for determining the transmit power based on the reference signal parameter.

Some examples of the method, apparatuses, and non-transitory computer-readable medium described herein may further include operations, features, means, or instructions for transmitting the uplink message using a first set of time-frequency resources based on the resource set identifier, and transmitting the second uplink message using a second set of time-frequency resources based on the second resource set identifier.

In some examples of the method, apparatuses, and non-transitory computer-readable medium described herein, the first and second sets of time-frequency resources at least partially overlap in time or frequency.

In some examples of the method, apparatuses, and non-transitory computer-readable medium described herein, the first and second sets of time-frequency resources may be non-overlapping in time and frequency.

Some examples of the method, apparatuses, and non-transitory computer-readable medium described herein may further include operations, features, means, or instructions for transmitting the uplink message during a first time period, and transmitting the second uplink message during a second time period that may be different from the first time period.

Some examples of the method, apparatuses, and non-transitory computer-readable medium described herein may further include operations, features, means, or instructions for transmitting the uplink message and the second uplink message on different sets of spatial layers.

Some examples of the method, apparatuses, and non-transitory computer-readable medium described herein may further include operations, features, means, or instructions for determining a set of transmission parameters for the uplink message based on the resource set identifier, where the set of transmission parameters includes an uplink beam.

Some examples of the method, apparatuses, and non-transitory computer-readable medium described herein may further include operations, features, means, or instructions for receiving an update message indicating the resource set identifier, the power control identifier, and a parameter identifier, the parameter identifier corresponding to a parameter of the uplink power control configuration for the UE, updating one or more power control parameters of the uplink power control configuration corresponding to the resource set identifier and the power control identifier based on the parameter identifier, and transmitting the uplink message using the resource set and in accordance with the updated one or more power control parameters.

In some examples of the method, apparatuses, and non-transitory computer-readable medium described herein, updating the uplink power control configuration may include operations, features, means, or instructions for updating a pathloss reference signal parameter of the uplink power control configuration based on the parameter identifier corresponding to a pathloss reference signal identifier.

A method of wireless communication is described. The method may include transmitting a first control message indicating a set of uplink power control configurations for a UE, each uplink power control configuration associated with a power control identifier and a resource set identifier, transmitting a second control message that schedules an uplink message for the UE, the second control message indicating the resource set identifier and the power control identifier for transmission of the uplink message, and receiving the uplink message using a resource set associated with the resource set identifier and in accordance with a transmit power associated with the uplink power control configuration.

An apparatus for wireless communication is described. The apparatus may include a processor, memory coupled with the processor, and instructions stored in the memory. The instructions may be executable by the processor to cause the apparatus to transmit a first control message indicating a set of uplink power control configurations for a UE, each uplink power control configuration associated with a power control identifier and a resource set identifier, transmit a second control message that schedules an uplink message for the UE, the second control message indicating the resource set identifier and the power control identifier for transmission of the uplink message, and receive the uplink message using a resource set associated with the resource set identifier and in accordance with a transmit power associated with the uplink power control configuration.

Another apparatus for wireless communication is described. The apparatus may include means for transmitting a first control message indicating a set of uplink power control configurations for a UE, each uplink power control configuration associated with a power control identifier and a resource set identifier, transmitting a second control message that schedules an uplink message for the UE, the second control message indicating the resource set identifier and the power control identifier for transmission of the uplink message, and receiving the uplink message using a resource set associated with the resource set identifier and in accordance with a transmit power associated with the uplink power control configuration.

A non-transitory computer-readable medium storing code for wireless communication is described. The code may include instructions executable by a processor to transmit a first control message indicating a set of uplink power control configurations for a UE, each uplink power control configuration associated with a power control identifier and a resource set identifier, transmit a second control message that schedules an uplink message for the UE, the second control message indicating the resource set identifier and the power control identifier for transmission of the uplink message, and receive the uplink message using a resource set associated with the resource set identifier and in accordance with a transmit power associated with the uplink power control configuration.

Some examples of the method, apparatuses, and non-transitory computer-readable medium described herein may further include operations, features, means, or instructions for transmitting an indication of a second uplink power control configuration for the UE, the second uplink power control configuration corresponding to a second power control identifier and a second resource set identifier different from the resource set identifier, and receiving a second uplink message using a second resource set associated with the second resource set identifier and in accordance with a second transmit power associated with the second uplink power control configuration.

Some examples of the method, apparatuses, and non-transitory computer-readable medium described herein may further include operations, features, means, or instructions for transmitting an update message indicating the resource set identifier and a parameter identifier, the parameter identifier corresponding to a parameter of the uplink power control configuration for the UE, and receiving, after transmitting the update message, the uplink message using the resource set and in accordance with an updated parameter of the uplink power control configuration.

In some examples of the method, apparatuses, and non-transitory computer-readable medium described herein, transmitting the update message may include operations, features, means, or instructions for transmitting the update message via a medium access control (MAC) control element (MAC-CE).

In some examples of the method, apparatuses, and non-transitory computer-readable medium described herein, the parameter identifier corresponds to a pathloss reference signal identifier.

In some examples of the method, apparatuses, and non-transitory computer-readable medium described herein, transmitting the first control message may include operations, features, means, or instructions for transmitting an RRC message that indicates one or more uplink power control configurations of the set of uplink power control configurations.

In some examples of the method, apparatuses, and non-transitory computer-readable medium described herein, transmitting the second control message may include operations, features, means, or instructions for transmitting downlink control information that schedules the uplink message for the UE.

BRIEF DESCRIPTION OF THE DRAWINGS

FIGS. 4A and 4B illustrate an example of transmission parameter updating techniques that support pathloss reference signal update for multiple beams in accordance with aspects of the present disclosure.

DETAILED DESCRIPTION

Figure 1:
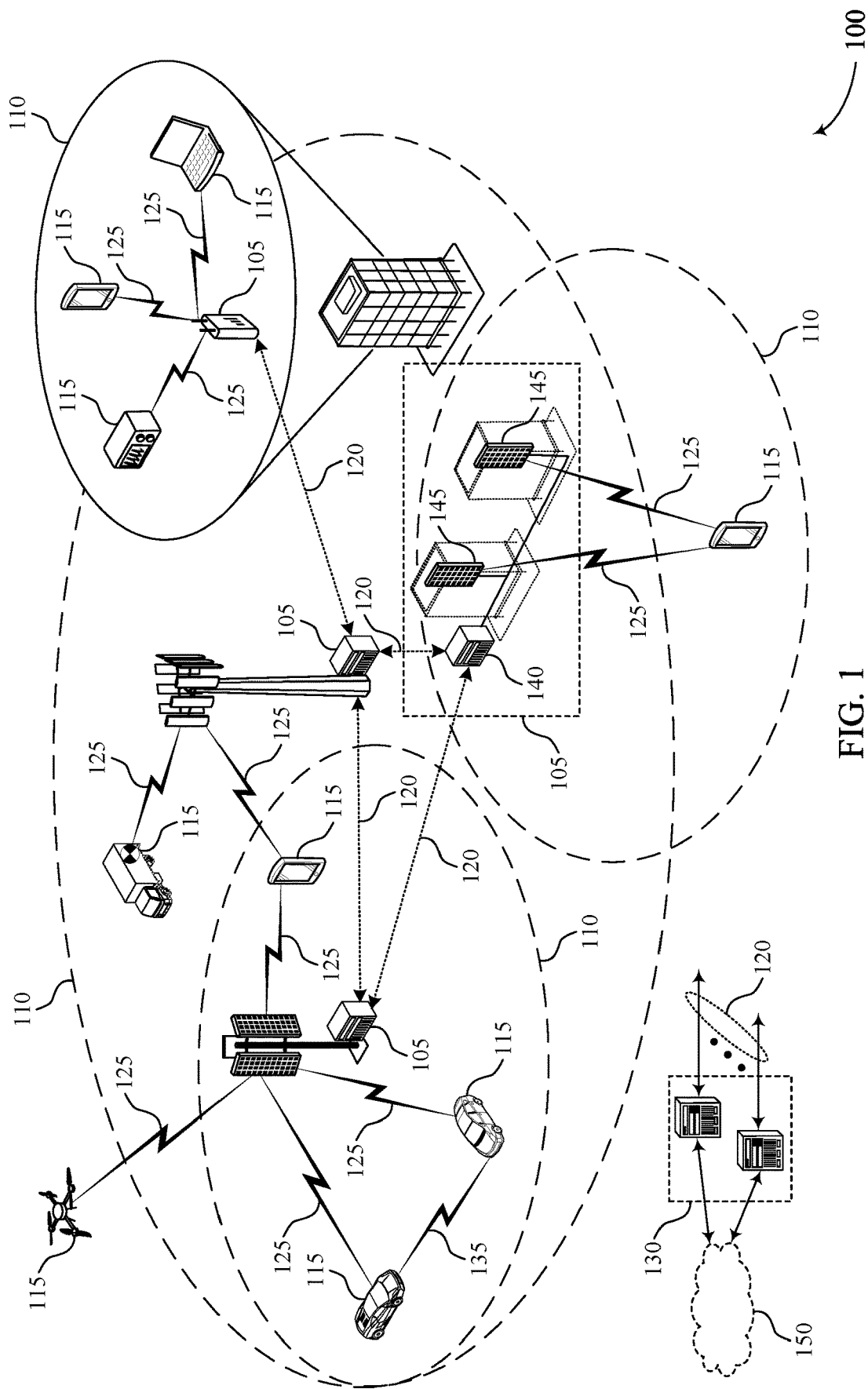
FIG. 1 illustrates an example of a wireless communications system that supports pathloss reference signal update for multiple beams in accordance with aspects of the present disclosure.

In some wireless communications systems, a user equipment (UE) may communicate with a base station via a beam or resource set, but the beam may be blocked or of poor quality. The UE may communicate across multiple beams (e.g., across multiple panels of a base station, across multiple base stations, etc.), which may support the use of at least one high quality beam. In some cases, the UE may be scheduled with multiple uplink transmission occasions (e.g., multiple physical uplink control channel transmissions (PUSCHs)) corresponding to the multiple beams. However, the power control parameters of the uplink transmissions may be associated with a particular beam or resource set, so a base station may lack the ability to configure different power control parameters for different resource sets. Additionally, the base station may lack the ability to update the power control parameters (e.g., path loss reference signal, received power level, partial pathloss compensation, etc.) for a particular resource set.

Various aspects of the present disclosure provide techniques for handling transmitting an uplink message according to a power control configuration for a resource set. For example, a base station may configure the UE with one or more power control configurations (e.g., one or more sounding reference signal (SRS) resource indicator (SRI) PUSCH Power Controls (SRI-PUSCH-PowerControl) configurations) as part of a resource control procedure (e.g., a radio resource control (RRC) procedure). A power control configuration may include a resource set identifier (e.g., sri-resource-setId) corresponding to a resource set (e.g., a link, a beam, a time period, etc.) and a power control identifier (e.g., sri-PUSCH-PowerControlId) corresponding to a group of uplink power control parameters (e.g., sri-PUSCH-PathlossReferenceRS-Id, sri-P0-PUSCH-AlphaSetId, sri-PUSCH-ClosedLoopIndex, etc.). The base station may transmit a control message (e.g., a downlink control information (DCI)) to the UE, and the control message may indicate a number of sounding reference signal (SRS) reference sets as well as a power control configuration corresponding to each SRS resource set.

Such techniques may include a base station updating a power control parameter (e.g., PUSCH Pathloss Reference RS ID) through the transmission of a downlink message (e.g., a medium access control (MAC) control element (CE)). The power control parameter may be part of a power control configuration that is associated with a resource set identifier and a power control identifier. Transmitting multiple uplink messages according to multiple power control configurations may decrease system latency and increase data throughput.

Aspects of the disclosure are initially described in the context of wireless communications systems. Aspects of the disclosure are further described in the context of uplink transmission techniques, transmission parameter updating techniques, and a process flow. Aspects of the disclosure are further illustrated by and described with reference to apparatus diagrams, system diagrams, and flowcharts that relate to pathloss reference signal update for multiple beams.

FIG. 1 illustrates an example of a wireless communications system 100 that supports pathloss reference signal update for multiple beams in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (CNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IOT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IOT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHZ), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHZ industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a UE 115 may be configured with a resource set (e.g., an SRS resource set) for codebook usage or non-codebook usage, and 4 SRS resource within a resource set may be configured for the UE 115. In some cases, the UE 115 may receive a DCI from a base station 105, and the DCI may indicate a power control identifier (e.g., sri-PUSCH-PowerControlId). The UE 115 may use the power control identifier as a codepoint of an SRI field in the DCI. For example, if the SRI field in the DCI is "X", the set of uplink power control parameters (pathloss reference signal, P0, alpha, closed loop index, etc.) used for an uplink transmission scheduled by the DCI may corresponding to a power control identifier of "X".

For example, a UE 115 may receive a first control message indicating an uplink power control configuration for the UE 115. The uplink power control configuration may be associated with a power control identifier and a resource set identifier. The UE 115 may receive a second control message that schedules an uplink message for the UE 115. The first control message and/or the second control message may be received from a base station 105. The second control message may indicate the resource set identifier and the power control identifier for transmission of the uplink message. The UE 115 may determine a transmit power for the uplink message based on a set of power control parameters, the set of power control parameters corresponding to the resource set identifier and the power control identifier. The UE 115 may transmit the uplink message using a resource set associated with the resource set identifier and in accordance with the determined transmit power.

Figure 2:
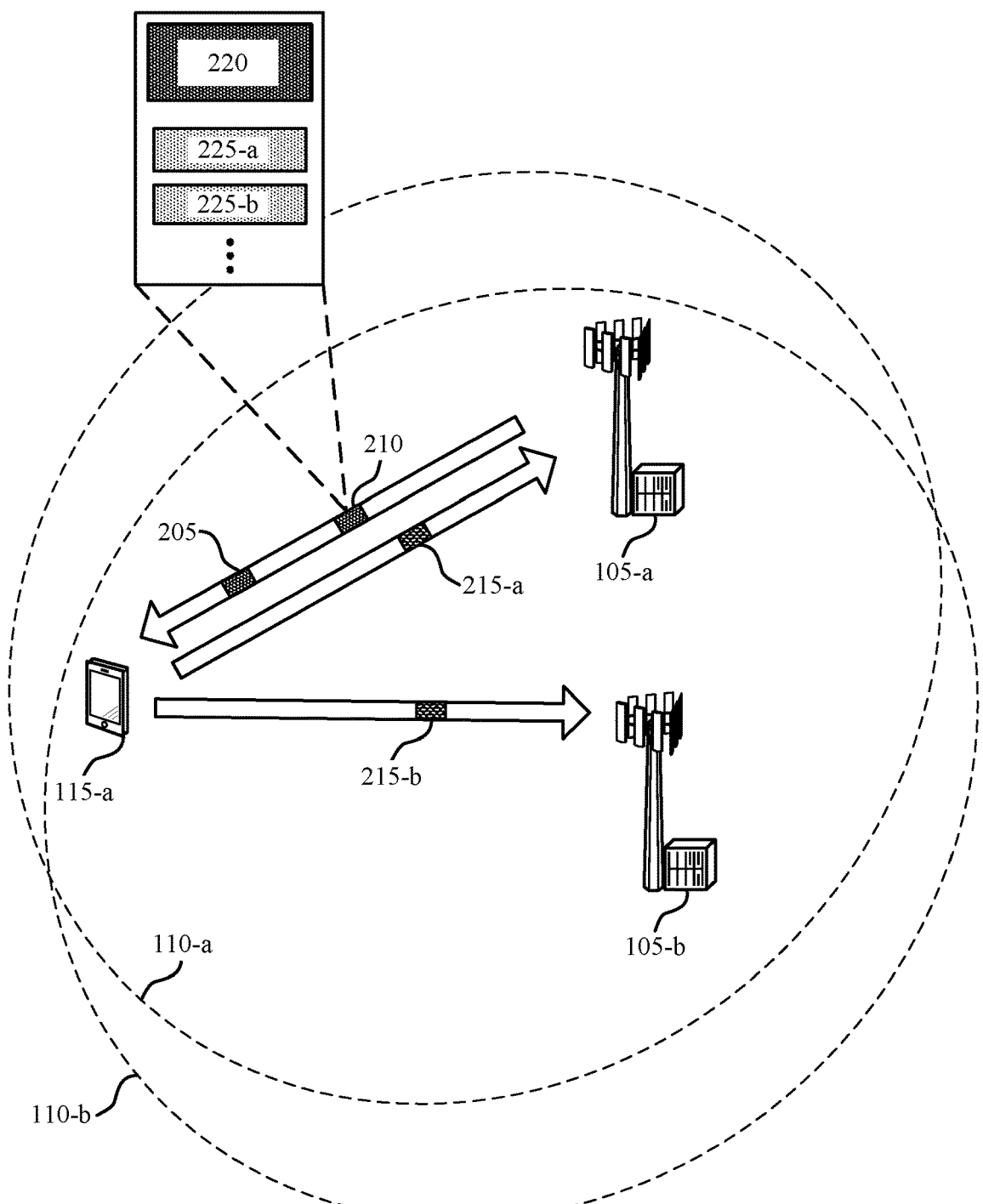
FIG. 2 illustrates an example of a wireless communications system that supports pathloss reference signal update for multiple beams in accordance with aspects of the present disclosure.

FIG. 2 illustrates an example of a wireless communications system 200 that supports pathloss reference signal update for multiple beams in accordance with aspects of the present disclosure. In some examples, wireless communications system 200 may implement aspects of wireless communication system 100. Wireless communications system 200 may include base station 105-*a* and base station 105-*b*, which may be examples of a base station 105 as described with reference to FIG. 1. Each base station 105 may be associated with a number of cells and a number of coverage areas 110. UE 115-*a* may communicate with one or more base stations 105 or one or more panels of a base station 105.

UE 115-*a* may be within coverage area 110-*a* of base station 105-*a* and coverage area 110-*b* of base station 105-*b*. UE 115-*a* may receive a first control message 205 (e.g., an RRC message) from base station 105-*a*. The first control message 205 may indicate a power control configuration for UE 105-*a*. In some cases, the first control message 205 may indicate a power control configuration that includes a resource set identifier (e.g., sri-resource-setId) and a power control identifier (e.g., sri-PUSCH-PowerControlId). The first control message 205 may additionally or alternatively indicate one or more uplink power control parameters (e.g., sri-PUSCH-PathlossReferenceRS-Id, sri-P0-PUSCH-AlphaSetId, sri-PUSCH-ClosedLoopIndex, etc.). UE 105-*a* may generate one or more tables corresponding to one or more power control configurations based on the first control message 205.

UE 115-*a* may receive a second control message 210 (e.g., a DCI message) from base station 105-*a*. The second control message 210 may include a resource field 220 indicating one or more SRS resource sets. An SRS resource set may be associated with codebook usage or non-codebook usage. The second control message 210 may additionally include one or SRI fields 225. In some cases, the number of SRI fields 225 may correspond to the number of SRS resource sets indicated in the resource field 220. An SRI field 225 may indicate a resource set identifier and a power control identifier. For example, the resource field 220 may indicate a first resource set and a second resource set, and SRI field 225-*a* may correspond to the first resource set since it is the first SRI field 225 of the second control message 210, while SRI field 225-*b* may correspond to the second resource set since it is the second SRI field 225 of the second control message 210. SRI field 225-*a* may indicate or correspond to a first power control identifier and SRI field 225-*b* may indicate or correspond to a second power control identifier.

In some cases, the second downlink message 210 may schedule one or more uplink messages (e.g., PUSCHs). For example, the second downlink message 210 may contain resource field 220 indicating a number of resource sets as well as a corresponding number of SRI fields 225. Each SRI field 225 may indicate a group of power control parameters associated with a resource set of the number of resource sets indicated by the resource field 220. The group of power control parameters indicated by an SRI field 225 may be used for transmitting an uplink message using a resource set indicated by the resource field 220.

UE 115-*a* may transmit a group of uplink messages 215 (e.g., one or more PUSCHs) to one or more base stations 105. For example, UE 115-*a* may transmit a first uplink message 215 to a first panel of a base station 105 and a second uplink message 215 to a second panel of the base station 105. In some additional or alternative cases, UE 115-*a* may transmit a first uplink message 215 to a first base station 105 and a second uplink message 215 to a second base station 105. For example, uplink message 215-*a* may be transmitted to base station 105-*a* using a first resource set indicated by SRI field 225-*a*, and uplink message 215-*b* may be transmitted to base station 105-*b* using a second resource set indicated by SRI field 225-*b*. In some additional or alternative examples, the transmit power of uplink message 215-*a* may be indicated by SRI field 225-*a*, and the transmit power of uplink message 215-*b* may be indicated by SRI field 225-*b*.

A resource set may correspond to an uplink transmission resource. For example, a resource set may correspond to a set of resource blocks, a beam, a link, a set of spatial layers, or the like. Transmitting a first uplink message to a base station using a first resource set and a second uplink message to a base station using a second resource set may reduce system latency and/or improve data throughput.

Figure 3A:
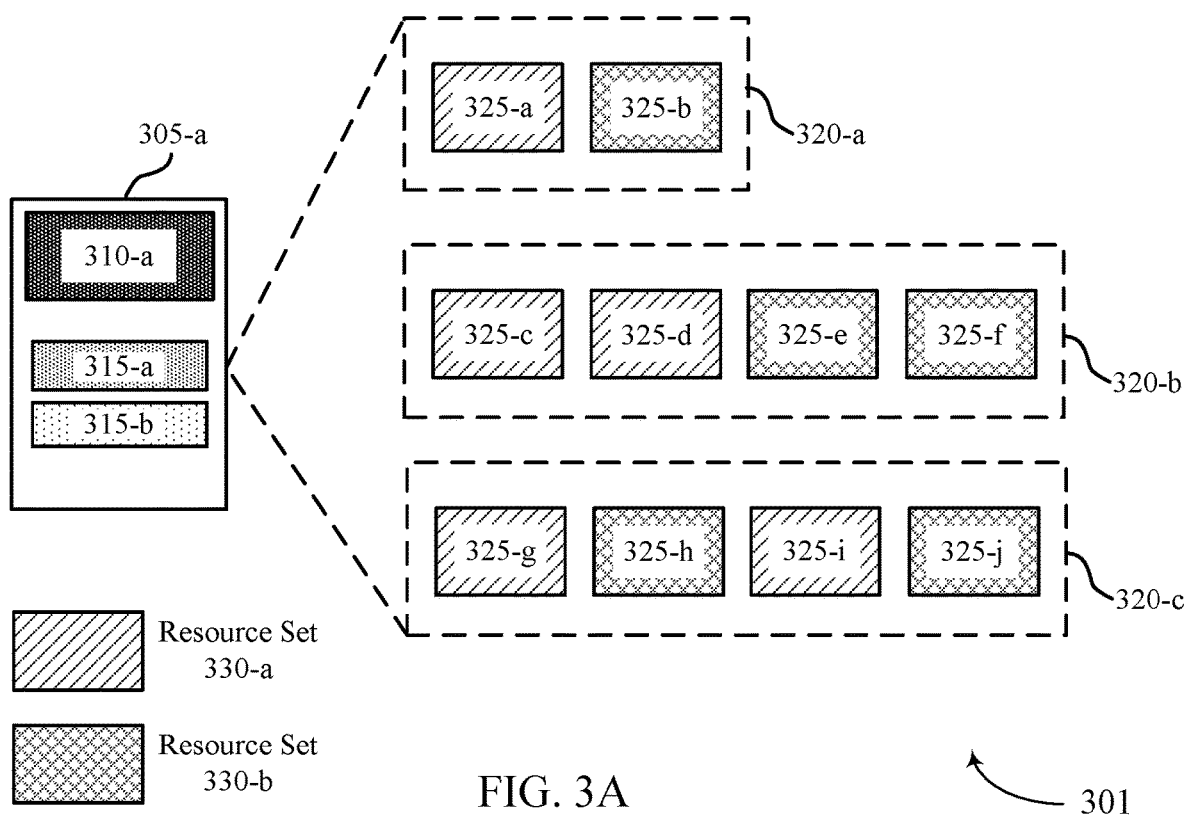
FIGS. 3A and 3B illustrates an example of uplink transmission techniques that support pathloss reference signal update for multiple beams in accordance with aspects of the present disclosure.
Figure 3B:
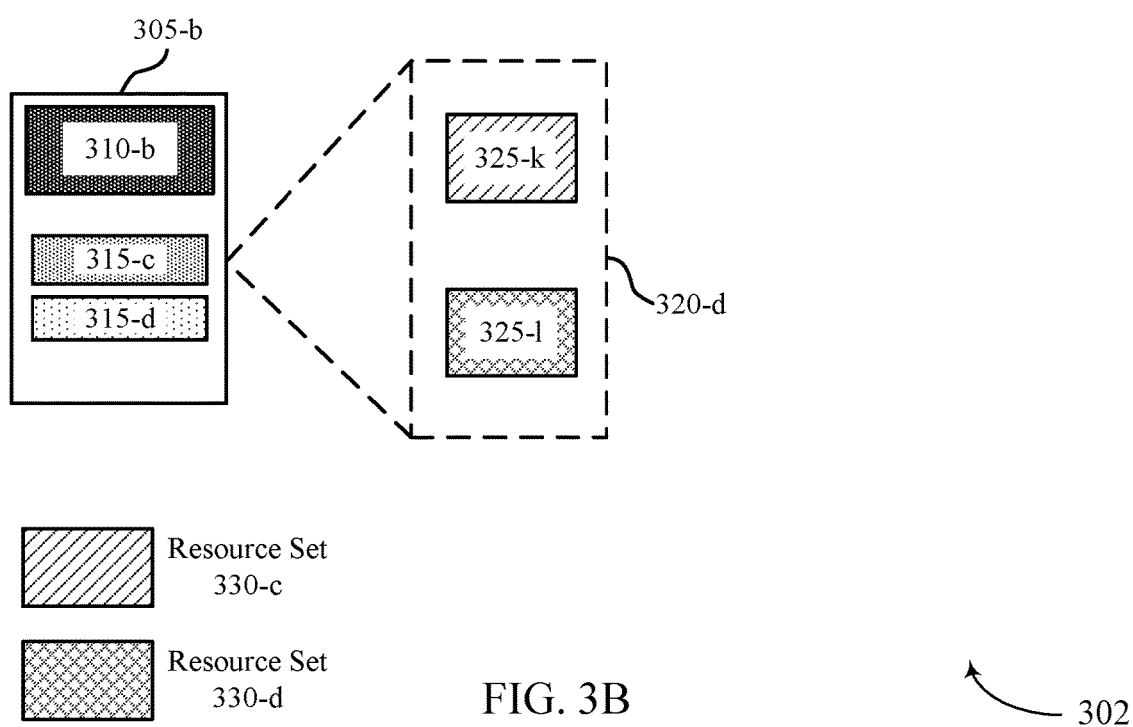

FIGS. 3A and 3B illustrate examples of uplink transmission techniques 301 and 302 that support pathloss reference signal update for multiple beams in accordance with aspects of the present disclosure. In some examples, uplink transmission techniques 301 and 302 may implement aspects of wireless communications system 100 or 200. The operations of uplink transmission techniques 301 and 302 may be implemented by a UE 115 or its components as described herein. A UE may receive a DCI 305 and transmit a number of uplink messages 325 using a number of resource sets 330 and according to an uplink transmission pattern 320. A DCI 305 may indicate one or more resource sets 330 and/or a power control configuration for one or more uplink messages 325.

In some cases, DCI 305-a may schedule two or more PUSCH repetitions. The UE may receive DCI 305-a, and DCI 305-a may contain resource field 310-a, SRI field 315-a, and SRI field 315-b. In some cases, the uplink messages 325 associated with resource set 330-a may be targeted toward a first base station, and the uplink messages 325 associated with resource set 330-b may be targeted toward a second base station. The uplink messages 325 associated with resource set 330-a may correspond to a first beam, a first precoding, a first spatial domain filter, first spatial relation info, a first set of power control parameters, or a first power control configuration, and the uplink messages 325 associated with resource set 330-b may correspond to a second beam, a second precoding, a second spatial domain filter, second spatial relation info, a second set of power control parameters, or a second power control configuration.

Uplink message 325-a may correspond to a first PUSCH transmission occasion of uplink transmission pattern 320-a, and uplink message 325-b may correspond to a second PUSCH transmission occasion of uplink transmission pattern 320-a. Uplink message 325-c may correspond to a first PUSCH transmission occasion of uplink transmission pattern 320-b, uplink message 325-d may correspond to a second PUSCH transmission occasion of uplink transmission pattern 320-b, uplink message 325-e may correspond to a third PUSCH transmission occasion of uplink transmission pattern 320-b, and uplink message 325-f may correspond to a fourth PUSCH transmission occasion of uplink transmission pattern 320-b. Uplink message 325-g may correspond to a first PUSCH transmission occasion of uplink transmission pattern 320-c, uplink message 325-h may correspond to a second PUSCH transmission occasion of uplink transmission pattern 320-c, uplink message 325-i may correspond to a third PUSCH transmission occasion of uplink transmission pattern 320-c, and uplink message 325-j may correspond to a fourth PUSCH transmission occasion of uplink transmission pattern 320-c.

The UE may identify uplink transmission pattern 320-a based on a DCI 305-a, an RRC message, or a configuration of the UE. SRI field 315-a may indicate that uplink message 325-a corresponds to resource set 330-a, and SRI field 315-b may indicate that uplink message 325-b corresponds to resource set 330-b. In some cases, the UE may identify uplink transmission pattern 320-b based on a DCI 305-a, an RRC message, or a configuration of the UE. SRI field 315-a may indicate that uplink message 325-c and uplink message 325-d correspond to resource set 330-a, and SRI field 315-b may indicate that uplink message 325-e and uplink message 325-f correspond to resource set 330-b. In some additional or alternative cases, the UE may identify uplink transmission pattern 320-c based on a DCI 305-a, an RRC message, or a configuration of the UE. SRI field 315-a may indicate that uplink message 325-g and uplink message 325-i correspond to resource set 330-a, and SRI field 315-b may indicate that uplink message 325-h and uplink message 325-j correspond to resource set 330-b.

In some cases, DCI 305-b may schedule an FDM PUSCH with different beams. The UE may receive DCI 305-b and transmit uplink message 325-k and uplink message 325-1 using resource set 330-c and resource set 330-d of uplink transmission pattern 320-d. DCI 305-b may contain resource field 310-b, SRI field 315-c, and SRI field 315-d. The SRI field 315-c may indicate that uplink message 325-k corresponds to resource set 330-c, and SRI field 315-d may indicate that uplink message 325-1 corresponds to resource set 320-d. Resource set 330-c may correspond to a first set of resource blocks, and resource set 330-d may correspond to a second set of resource blocks.

In some cases, a DCI 305 may schedule a spatial division multiplexed (SDM) PUSCH transmission with different beams. For example, resource set 330-c may correspond to a first set of spatial layers and resource set 330-d may correspond to a second set of spatial layers. A resource set 330 may correspond to a beam, a link, a set of resource blocks, a carrier, or the like. Transmitting uplink messages 325 according to an uplink transmission technique 301 or 302 may improve communication reliability. For example, if a link associated with a first resource set 330 is blocked, another link associated with a second resource set 330 may not be blocked, which may improve communication diversity and reliability.

Figure 4A:
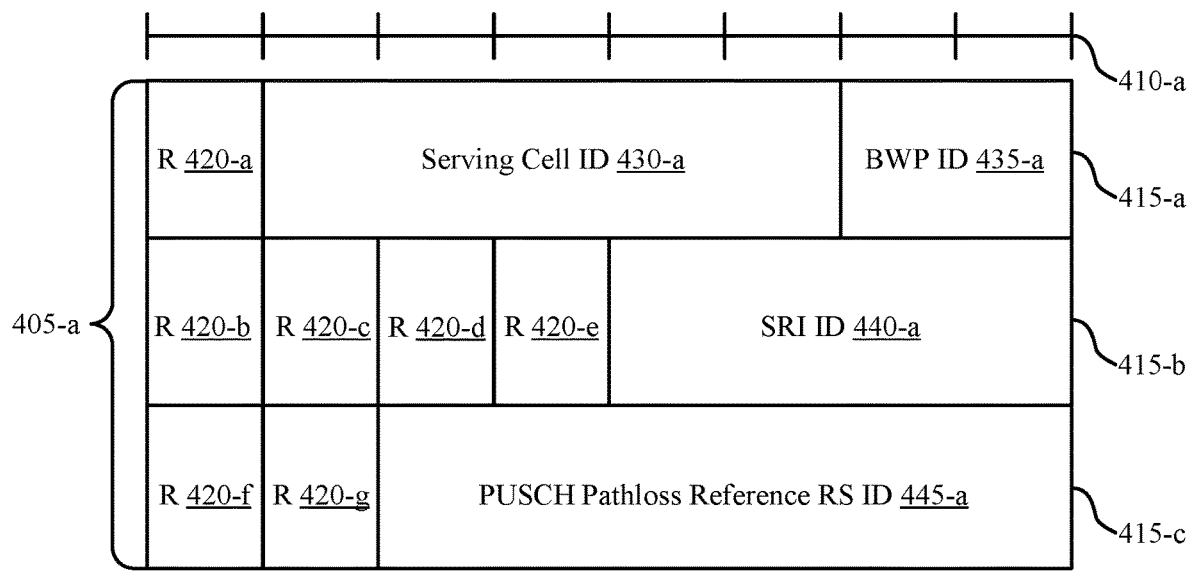
Figure 4A:
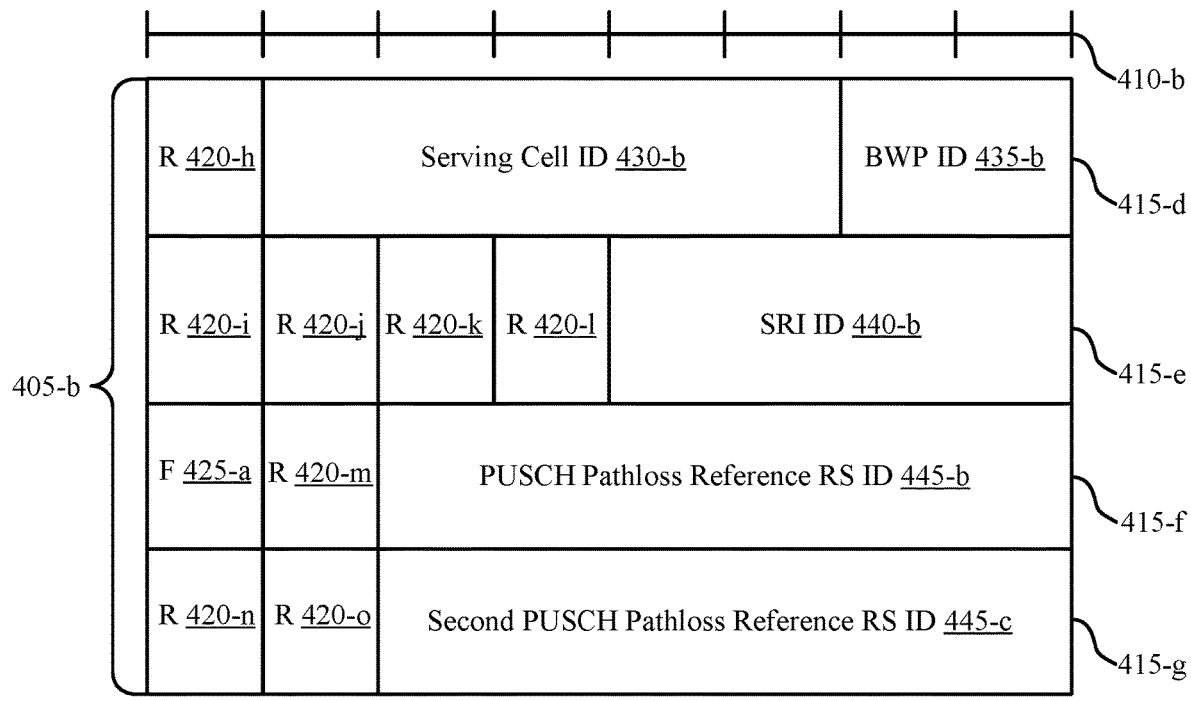

FIGS. 4A and 4B illustrate examples of transmission parameter updating techniques 401 and 402 that support pathloss reference signal update for multiple beams in accordance with aspects of the present disclosure. In some examples, transmission parameter updating techniques 401 and 402 may implement aspects of wireless communication system 100 or 200. The operations of transmission parameter updating techniques 401 and 402 may be implemented by a UE 115, the components of the UE 115, a base station 105, or the components of the base station 105, as described herein. A UE may receive a downlink message 405 (e.g., a MAC CE) from a base station and transmit a number of uplink messages based on receiving the downlink message 405. A downlink message 405 may be grouped into a number of octets 415, as shown by bit indicator 410-a and bit indicator 410-b.

Downlink message 405-a may contain serving cell ID 430-a that indicates a serving cell and a bandwidth part (BWP) ID 435-a that indicates a BWP. Downlink message 405-a may contain a number of reserved bits 420. For example, downlink message 405-a may contain reserved bit 420-a of octet 415-a, reserved bit 420-b, reserved bit 420-c, reserved bit 420-d, and reserved bit 420-e of octet 415-b, and reserved bit 420-f and reserved bit 420-g of octet 415-c. In some cases, one or more reserved bits 420 may be used to indicate a resource set (e.g., resource-setId, sri-resource-setId, etc.). In some additional or alternative cases, a new field may be added to downlink message 405-a to indicate a resource set.

In some cases, the combination of an indication of a resource set and the indication of a power control identifier (e.g., SRI ID 440-a, sri-PUSCH-PowerControlId, etc.) may indicate a power control configuration for a resource set. In some cases, downlink message 405-*a* may update the power control configuration for the resource set by indicating a parameter of the resource set (e.g., PUSCH Pathloss Reference RS ID 445-*a*). The UE may update the power control configuration based on the power control identifier and the resource set according to the indicated parameter. In some cases, the UE will transmit a set of uplink messages (e.g., PUSCHs) according to the updated power control configuration. For example, the UE may receive a downlink message (e.g., a DCI) that indicates the updated power control configuration (e.g., by indicating a resource set and a power control identifier), and the UE may transmit a set of uplink messages scheduled by the downlink message according to the updated power control configuration.

Downlink message 405-*b* may contain serving cell ID 430-*b* that indicates a serving cell and a BWP ID 435-*b*. Downlink message 405-*b* may contain a number of reserved bits 420. For example, downlink message 405-*b* may contain reserved bit 420-*h* of octet 415-*d*, reserved bit 420-*i*, reserved bit 420-*j*, reserved bit 420-*k*, and reserved bit 420-1 of octet 415-*e*, reserved bit 420-*m* of octet 415-*f*, and reserved bit 420-*n* and reserved bit 420-*o* of octet 415-*g*. Octet 415-*f* may contain bit 425-*a*, and bit 425-*a* may correspond to a reserved bit that indicates whether a second power control parameter (e.g., a second PUSCH PL RS ID field) is present in downlink message 405-*b*. In some examples, bit 425-*a* indicating a bit value of "1" may indicate that an additional power control parameter is included in downlink message 405-*b*, and bit 425-*a* indicating a bit value of "0" may indicate that an additional power control parameter is not included in downlink message 405-*b*. Octet 415-*g* or the second PUSCH Pathloss Reference RS ID 445-*c* may be included in downlink message 405-*b* when bit 425-*a* indicates that an additional power control parameter is included in downlink message 405-*b*.

Downlink message 405-*b* may support a base station in updating a pair of pathloss reference signals for a power control identifier (e.g., SRI ID 440-*b*, sri-PUSCH-Power-ControlId, etc.). A UE may transmit a number of uplink messages (e.g., PUSCHs) according to a number of powers (e.g., a number of transmit powers, PUSCH Pathloss reference RS ID 445-*b* and PUSCH Pathloss reference RS ID 445-*b*, etc.) indicated in downlink message 405-*b*. For example, the UE may receive a downlink message (e.g., a DCI) that schedules a number of uplink messages corresponding to the power control configuration associated with to SRI ID 440-*b*. The UE may transmit the number of uplink messages according to the number of power control parameters included in downlink message 405-*b*. For example, the UE may transmit the first uplink message according to PUSCH Pathloss Reference RS ID 445-*b* and the second uplink message according to PUSCH Pathloss Reference RS ID 445-*c*. Transmitting a number of uplink messages according to power control parameters (e.g., a transmit power, a PUSCH power, PUSCH Pathloss Reference RS ID, etc.) indicated in a downlink message (e.g., a MAC CE) may decrease system latency and improve reliability.

Figure 5:
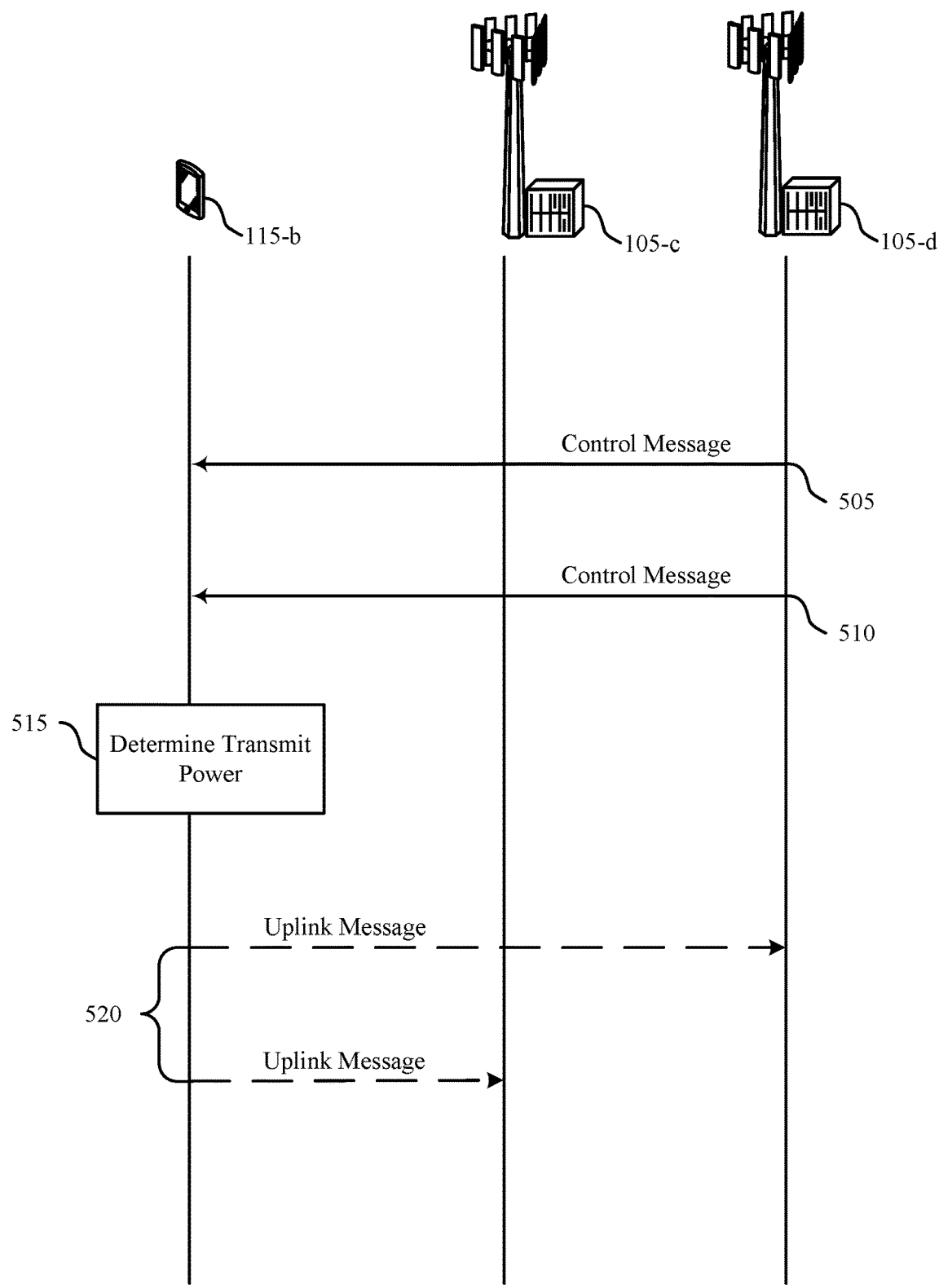
FIG. 5 illustrates an example of a process flow that supports pathloss reference signal update for multiple beams in accordance with aspects of the present disclosure.

FIG. 5 illustrates an example of a process flow 500 that supports pathloss reference signal update for multiple beams in accordance with aspects of the present disclosure. In some examples, process flow 500 may implement aspects of wireless communication system 100 or 200. The process flow 500 includes UE 115-*b*, base station 105-*c*, and base station 105-*d*, which may be examples of the corresponding devices described with reference to FIGS. 1 through 4. UE 115-*b* may transmit uplink messages according to multiple resource sets or beams to improve network efficiency and decrease latency. Alternative examples of the following may be implemented, where some steps are performed in a different order than described or are not performed at all. In some cases, steps may include additional features not mentioned below, or further steps may be added.

At 505, UE 115-*b* may receive a first control message (e.g., an RRC message) indicating an uplink power control configuration for UE 115-*b*. The uplink power control configuration may be associated with a power control identifier (e.g., an SRI identifier, sri-PUSCH-PowerControlId, etc.) and a resource set identifier (e.g., resource-set-Id, sri-resource-setId, etc.). The power control identifier, resource set identifier, or a combination thereof may be associated with a power control configuration (e.g., SRI-PUSCH-Power-Control) for uplink transmissions.

At 510, UE 115-*b* may receive a second control message (e.g., a DCI) that schedules an uplink message for UE 115-*b*. The second control message may indicate the resource set identifier and the power control identifier for the uplink message.

At 515, UE 115-*b* may determine a transmit power for the uplink message based on a set of power control parameters. The set of power control parameters may correspond to the resource set identifier and the power control identifier. In some cases, the combination of a resource set identifier and a power control identifier may correspond to a power control configuration.

At 520, UE 115-*b* may transmit the uplink message using a resource set associated with the resource set identifier and in accordance with the determined transmit power. In some cases, UE 115-*b* may transmit a number of uplink messages. For example, the second control message may indicate two resource sets, and UE 115-*b* may transmit a first uplink message to a first panel of base station 105-*d* using the first resource set and a second uplink message to a second panel of base statin 105-*d* using the second resource set. In some additional or alternative examples, UE 115-*b* may transmit a first uplink message to base station 105-*c* using a first resource set and a second uplink message to base station 105-*d* using a second resource set. In some cases, the transmit power of the first uplink message may be the same as the transmit power of the second uplink message, while in some other cases, the transmit power of the first uplink message may be different from the transmit power of the second uplink message.

Figure 6:
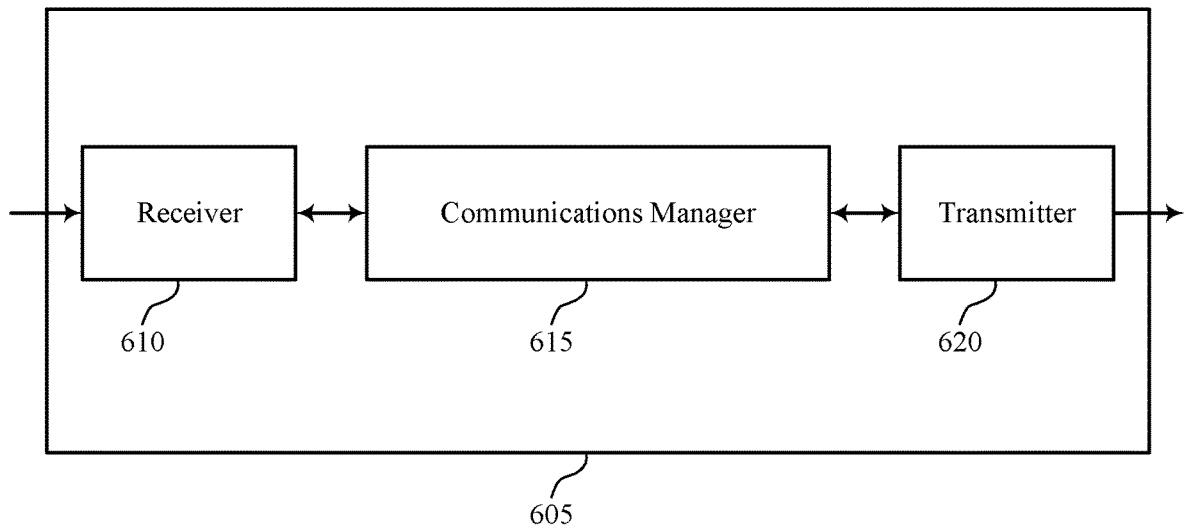
FIGS. 6 and 7 show block diagrams of devices that support pathloss reference signal update for multiple beams in accordance with aspects of the present disclosure.

FIG. 6 shows a block diagram 600 of a device 605 that supports pathloss reference signal update for multiple beams in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to pathloss reference signal update for multiple beams, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive a first control message indicating a set of uplink power control configurations for the UE, each uplink power control configuration associated with a power control identifier and a resource set identifier, receive a second control message that schedules an uplink message for the UE, the second control message indicating the resource set identifier and the power control identifier for transmission of the uplink message, determine a transmit power for the uplink message based on a set of power control parameters, the set of power control parameters corresponding to the resource set identifier and the power control identifier, and transmit the uplink message using a resource set associated with the resource set identifier and in accordance with the determined transmit power. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
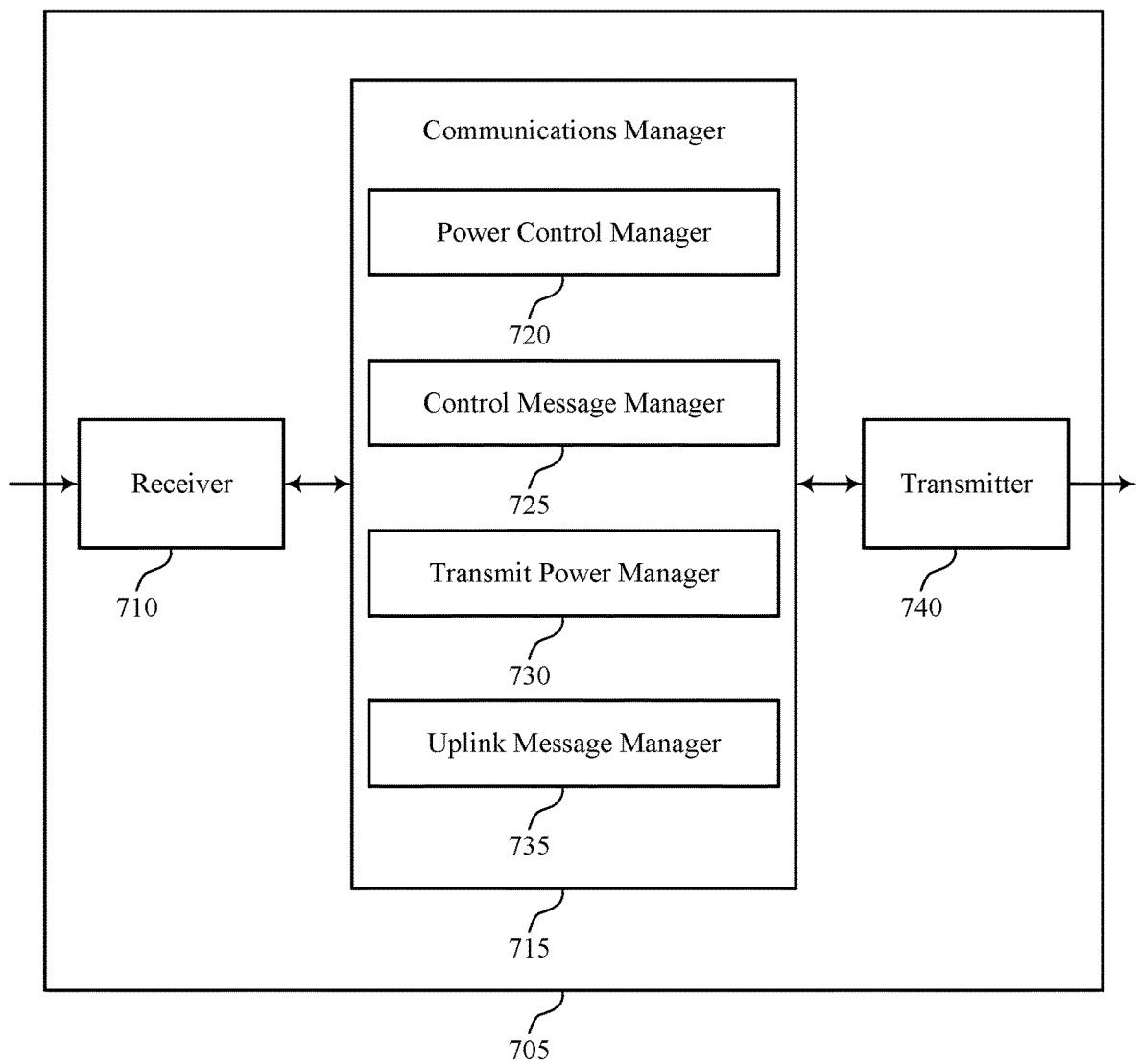

FIG. 7 shows a block diagram 700 of a device 705 that supports pathloss reference signal update for multiple beams in accordance with aspects of the present disclosure. The device 705 may be an example of aspects of a device 605, or a UE 115 as described herein. The device 705 may include a receiver 710, a communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to pathloss reference signal update for multiple beams, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a power control manager 720, a control message manager 725, a transmit power manager 730, and an uplink message manager 735. The communications manager 715 may be an example of aspects of the communications manager 910 described herein.

The power control manager 720 may receive a first control message indicating a set of uplink power control configurations for the UE, each uplink power control configuration associated with a power control identifier and a resource set identifier. The control message manager 725 may receive a second control message that schedules an uplink message for the UE, the second control message indicating the resource set identifier and the power control identifier for transmission of the uplink message.

The transmit power manager 730 may determine a transmit power for the uplink message based on a set of power control parameters, the set of power control parameters corresponding to the resource set identifier and the power control identifier. The uplink message manager 735 may transmit the uplink message using a resource set associated with the resource set identifier and in accordance with the determined transmit power.

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

Figure 8:
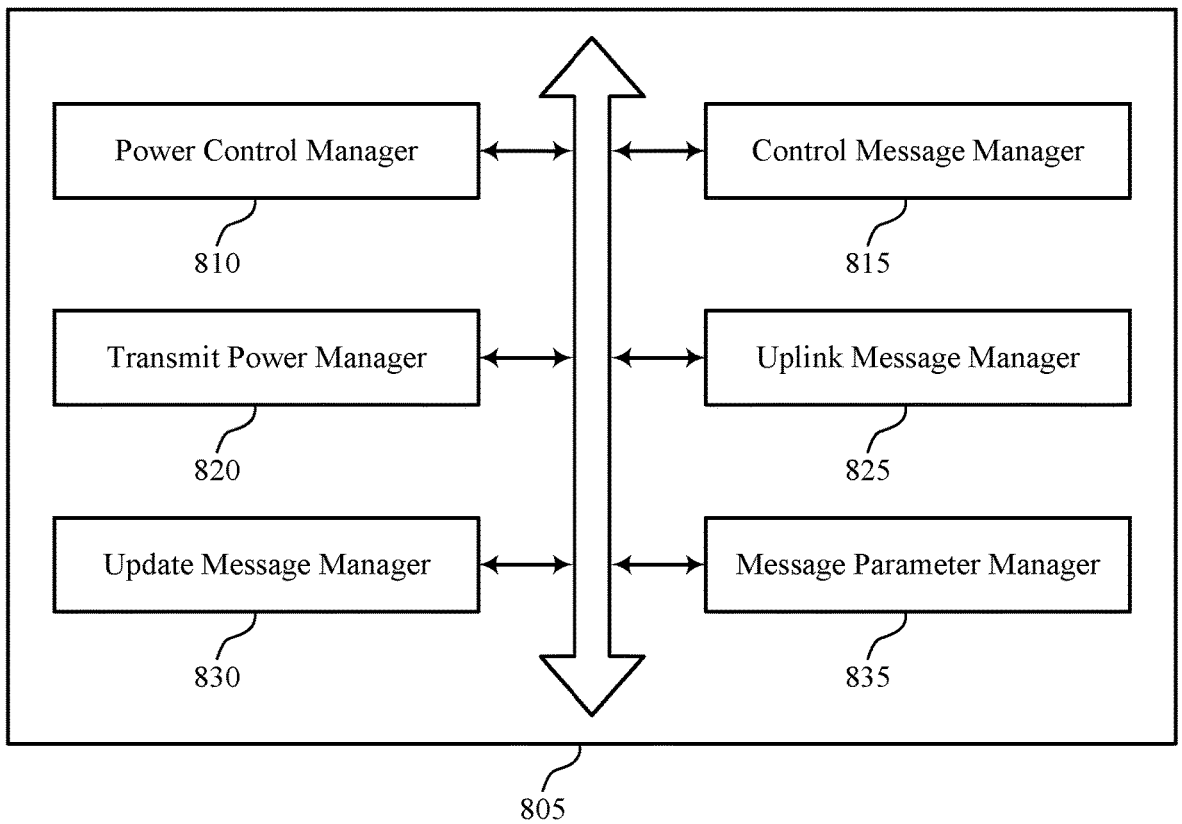
FIG. 8 shows a block diagram of a communications manager that supports pathloss reference signal update for multiple beams in accordance with aspects of the present disclosure.

FIG. 8 shows a block diagram 800 of a communications manager 805 that supports pathloss reference signal update for multiple beams in accordance with aspects of the present disclosure. The communications manager 805 may be an example of aspects of a communications manager 615, a communications manager 715, or a communications manager 910 described herein. The communications manager 805 may include a power control manager 810, a control message manager 815, a transmit power manager 820, an uplink message manager 825, an update message manager 830, and a message parameter manager 835. Each of these modules may communicate, directly or indirectly, with one another (e.g., via one or more buses).

The power control manager 810 may receive a first control message indicating a set of uplink power control configurations for the UE, each uplink power control configuration associated with a power control identifier and a resource set identifier. In some examples, the power control manager 810 may receive an indication of a second uplink power control configuration for the UE, the second uplink power control configuration associated with a second power control identifier and a second resource set identifier different from the resource set identifier.

In some examples, the power control manager 810 may update the uplink power control configuration corresponding to the resource set identifier and the power control identifier with the reference signal parameter. In some examples, the power control manager 810 may determine that an additional reference signal field is present in the update message based on an indicator in the update message. In some examples, the power control manager 810 may update the second uplink power control configuration corresponding to the second resource set identifier and the power control identifier with a second reference signal parameter based on the additional reference signal field.

In some examples, the power control manager 810 may update one or more power control parameters of the uplink power control configuration corresponding to the resource set identifier and the power control identifier based on the parameter identifier. In some examples, the power control manager 810 may update a pathloss reference signal parameter of the uplink power control configuration based on the parameter identifier corresponding to a pathloss reference signal identifier.

The control message manager 815 may receive a second control message that schedules an uplink message for the UE, the second control message indicating the resource set identifier and the power control identifier for transmission of the uplink message.

The transmit power manager 820 may determine a transmit power for the uplink message based on a set of power control parameters, the set of power control parameters corresponding to the resource set identifier and the power control identifier. In some examples, the transmit power manager 820 may determine a second transmit power for the second uplink message based on a second set of power control parameters, the second set of power control parameters corresponding to the second resource set identifier and the second power control identifier.

In some examples, the transmit power manager 820 may determine the second transmit power based on the second reference signal parameter. In some examples, the transmit power manager 820 may determine the transmit power based on the reference signal parameter.

The uplink message manager 825 may transmit the uplink message using a resource set associated with the resource set identifier and in accordance with the determined transmit power. In some examples, the uplink message manager 825 may identify a second uplink message for transmission by the UE based on the second control message, the second uplink message associated with the second resource set identifier and the second power control identifier.

In some examples, the uplink message manager 825 may transmit the second uplink message using a second resource set associated with the second resource set identifier and in accordance with the determined second transmit power. In some examples, the uplink message manager 825 may transmit, after updating the uplink power control configuration, the uplink message based on the reference signal parameter.

In some examples, the uplink message manager 825 may transmit, after updating the second uplink power control configuration, with the second uplink message based on the second reference signal parameter. In some examples, the uplink message manager 825 may transmit the uplink message using a first set of time-frequency resources based on the resource set identifier.

In some examples, the uplink message manager 825 may transmit the second uplink message using a second set of time-frequency resources based on the second resource set identifier. In some examples, the uplink message manager 825 may transmit the uplink message during a first time period. In some examples, the uplink message manager 825 may transmit the second uplink message during a second time period that is different from the first time period.

In some examples, the uplink message manager 825 may transmit the uplink message and the second uplink message on different sets of spatial layers. In some examples, the uplink message manager 825 may transmit the uplink message using the resource set and in accordance with the updated one or more power control parameters. In some cases, the first and second sets of time-frequency resources at least partially overlap in time or frequency. In some cases, the first and second sets of time-frequency resources are non-overlapping in time and frequency.

The update message manager 830 may receive an update message including the resource set identifier, the power control identifier, and a reference signal parameter for an update in the uplink power control configuration. In some examples, the update message manager 830 may receive an update message indicating the resource set identifier, the power control identifier, and a parameter identifier, the parameter identifier corresponding to a parameter of the uplink power control configuration for the UE.

The message parameter manager 835 may determine a set of transmission parameters for the uplink message based on the resource set identifier, where the set of transmission parameters includes an uplink beam.

Figure 9:
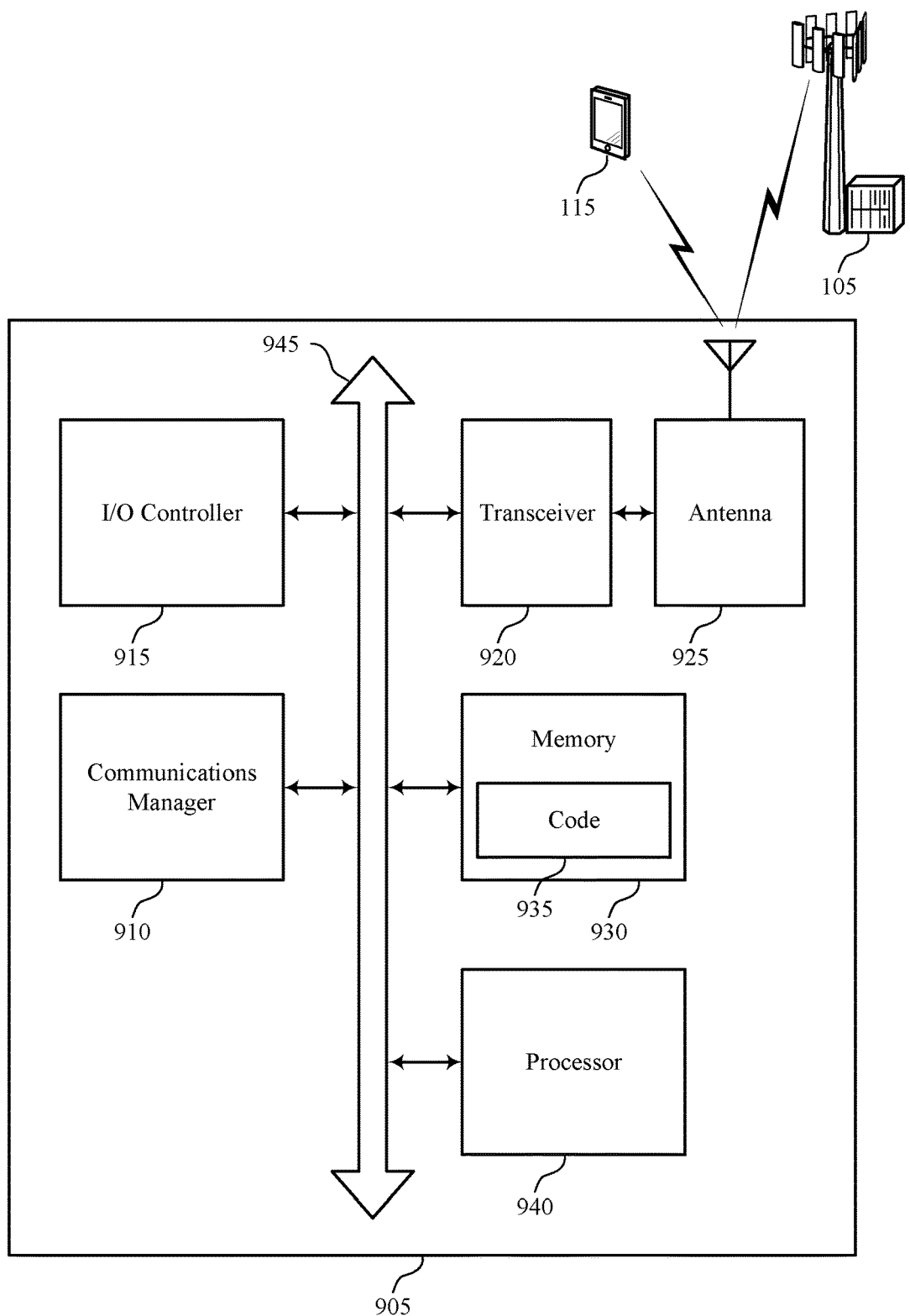
FIG. 9 shows a diagram of a system including a device that supports pathloss reference signal update for multiple beams in accordance with aspects of the present disclosure.

FIG. 9 shows a diagram of a system 900 including a device 905 that supports pathloss reference signal update for multiple beams in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive a first control message indicating a set of uplink power control configurations for the UE, each uplink power control configuration associated with a power control identifier and a resource set identifier, receive a second control message that schedules an uplink message for the UE, the second control message indicating the resource set identifier and the power control identifier for transmission of the uplink message, determine a transmit power for the uplink message based on a set of power control parameters, the set of power control parameters corresponding to the resource set identifier and the power control identifier, and transmit the uplink message using a resource set associated with the resource set identifier and in accordance with the determined transmit power.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting pathloss reference signal update for multiple beams).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
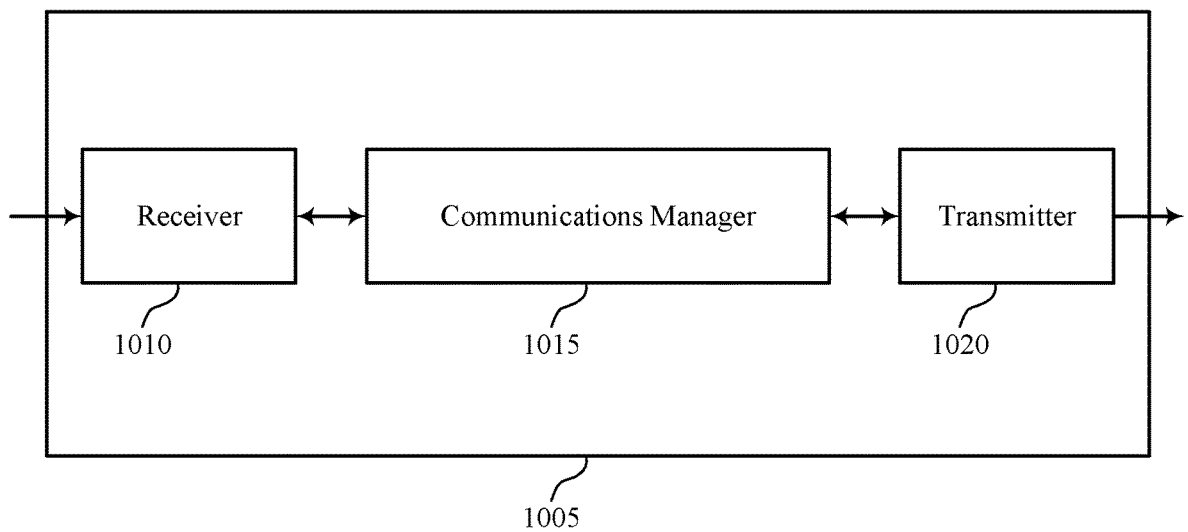
FIGS. 10 and 11 show block diagrams of devices that support pathloss reference signal update for multiple beams in accordance with aspects of the present disclosure.

FIG. 10 shows a block diagram 1000 of a device 1005 that supports pathloss reference signal update for multiple beams in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to pathloss reference signal update for multiple beams, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit a first control message indicating an uplink power control configuration for a UE, the uplink power control configuration associated with a power control identifier and a resource set identifier, transmit a second control message that schedules an uplink message for the UE, the second control message indicating the resource set identifier and the power control identifier for transmission of the uplink message, and receive the uplink message using a resource set associated with the resource set identifier and in accordance with a transmit power associated with the uplink power control configuration. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
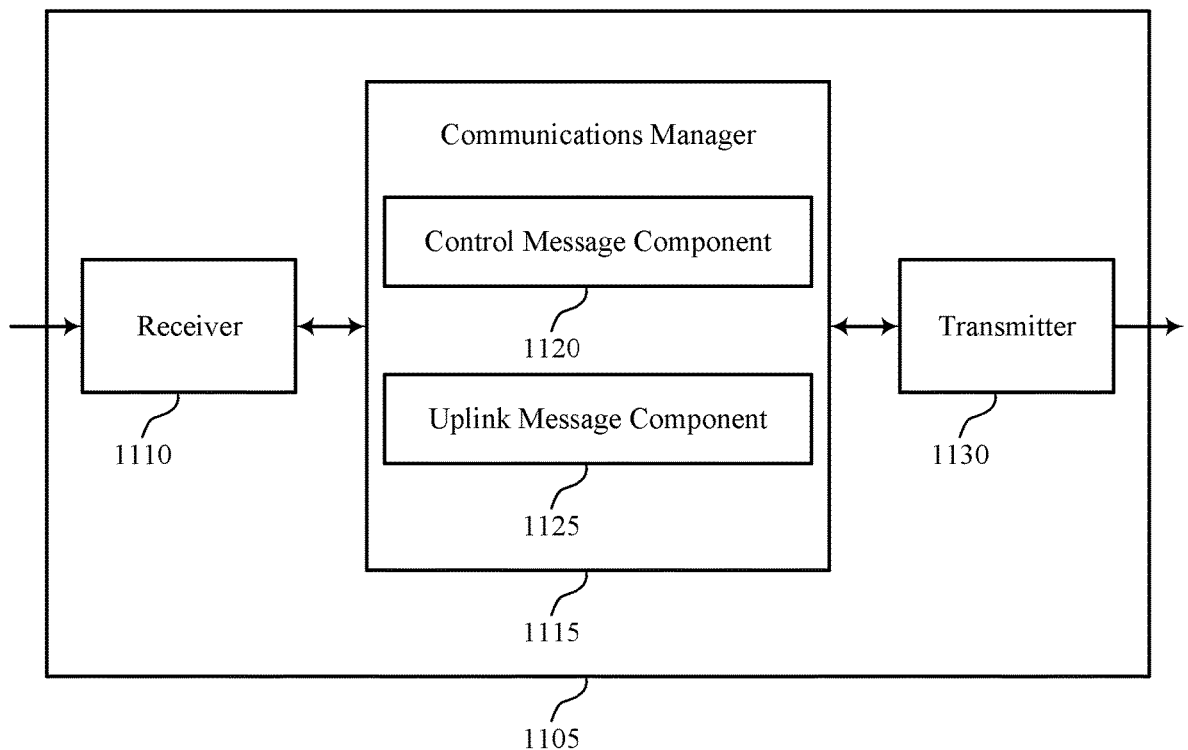

FIG. 11 shows a block diagram 1100 of a device 1105 that supports pathloss reference signal update for multiple beams in accordance with aspects of the present disclosure. The device 1105 may be an example of aspects of a device 1005, or a base station 105 as described herein. The device 1105 may include a receiver 1110, a communications manager 1115, and a transmitter 1130. The device 1105 may also include a processor. Each of these components may be in communication with one another (e.g., via one or more buses).

The receiver 1110 may receive information such as packets, user data, or control information associated with various information channels (e.g., control channels, data channels, and information related to pathloss reference signal update for multiple beams, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a control message component 1120 and an uplink message component 1125. The communications manager 1115 may be an example of aspects of the communications manager 1310 described herein.

The control message component 1120 may transmit a first control message indicating an uplink power control configuration for a UE, the uplink power control configuration associated with a power control identifier and a resource set identifier and transmit a second control message that schedules an uplink message for the UE, the second control message indicating the resource set identifier and the power control identifier for transmission of the uplink message.

The uplink message component 1125 may receive the uplink message using a resource set associated with the resource set identifier and in accordance with a transmit power associated with the uplink power control configuration.

The transmitter 1130 may transmit signals generated by other components of the device 1105. In some examples, the transmitter 1130 may be collocated with a receiver 1110 in a transceiver module. For example, the transmitter 1130 may be an example of aspects of the transceiver 1320 described with reference to FIG. 13. The transmitter 1130 may utilize a single antenna or a set of antennas.

Figure 12:
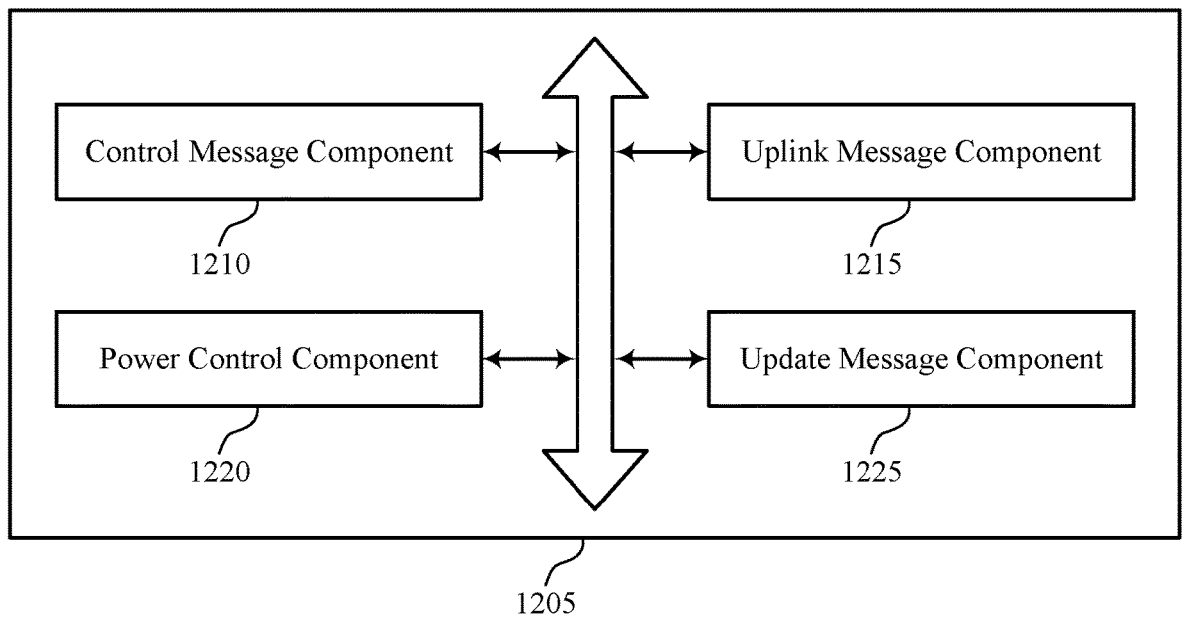
FIG. 12 shows a block diagram of a communications manager that supports pathloss reference signal update for multiple beams in accordance with aspects of the present disclosure.

FIG. 12 shows a block diagram 1200 of a communications manager 1205 that supports pathloss reference signal update for multiple beams in accordance with aspects of the present disclosure. The communications manager 1205 may be an example of aspects of a communications manager 1015, a communications manager 1115, or a communications manager 1310 described herein. The communications manager 1205 may include a control message component 1210, an uplink message component 1215, a power control component 1220, and an update message component 1225. Each of these modules may communicate, directly or indirectly, with one another (e.g., via one or more buses).

The control message component 1210 may transmit a first control message indicating an uplink power control configuration for a UE, the uplink power control configuration associated with a power control identifier and a resource set identifier.

In some examples, the control message component 1210 may transmit a second control message that schedules an uplink message for the UE, the second control message indicating the resource set identifier and the power control identifier for transmission of the uplink message.

In some examples, the control message component 1210 may transmit an RRC message that indicates one or more uplink power control configurations of the set of uplink power control configurations. In some examples, the control message component 1210 may transmit downlink control information that schedules the uplink message for the UE.

The uplink message component 1215 may receive the uplink message using a resource set associated with the resource set identifier and in accordance with a transmit power associated with the uplink power control configuration. In some examples, the uplink message component 1215 may receive a second uplink message using a second resource set associated with the second resource set identifier and in accordance with a second transmit power associated with the second uplink power control configuration.

In some examples, the uplink message component 1215 may receive, after transmitting the update message, the uplink message using the resource set and in accordance with an updated parameter of the uplink power control configuration.

The power control component 1220 may transmit an indication of a second uplink power control configuration for the UE, the second uplink power control configuration corresponding to the power control identifier and a second resource set identifier different from the resource set identifier.

The update message component 1225 may transmit an update message indicating the resource set identifier, the power control identifier, and a parameter identifier, the parameter identifier corresponding to a parameter of the uplink power control configuration for the UE. In some examples, the update message component 1225 may transmit the update message via a medium access control (MAC) control element (MAC-CE). In some cases, the parameter identifier corresponds to a pathloss reference signal identifier.

Figure 13:
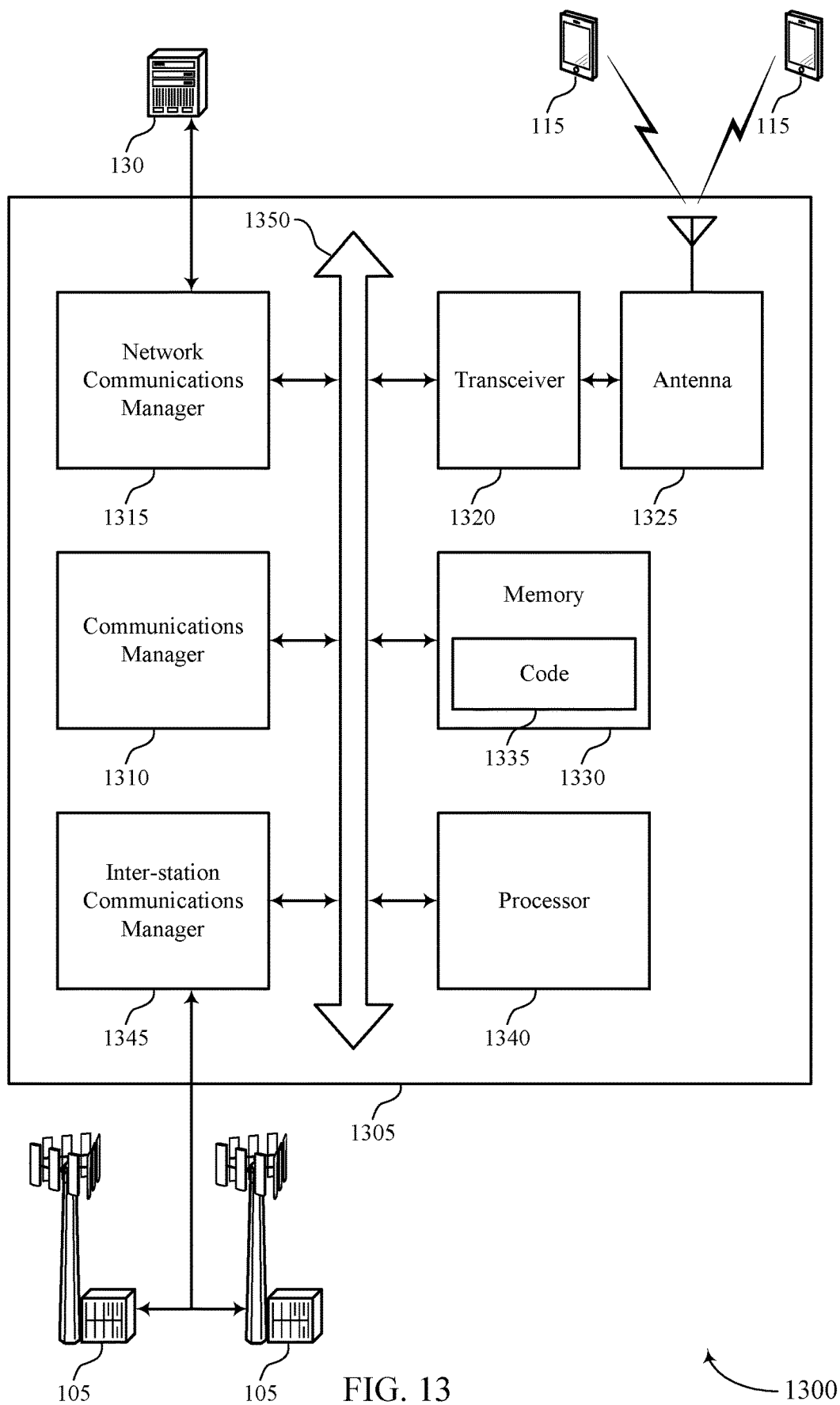
FIG. 13 shows a diagram of a system including a device that supports pathloss reference signal update for multiple beams in accordance with aspects of the present disclosure.

FIG. 13 shows a diagram of a system 1300 including a device 1305 that supports pathloss reference signal update for multiple beams in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may transmit a first control message indicating an uplink power control configuration for a UE, the uplink power control configuration associated with a power control identifier and a resource set identifier, transmit a second control message that schedules an uplink message for the UE, the second control message indicating the resource set identifier and the power control identifier for transmission of the uplink message, and receive the uplink message using a resource set associated with the resource set identifier and in accordance with a transmit power associated with the uplink power control configuration.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting pathloss reference signal update for multiple beams).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
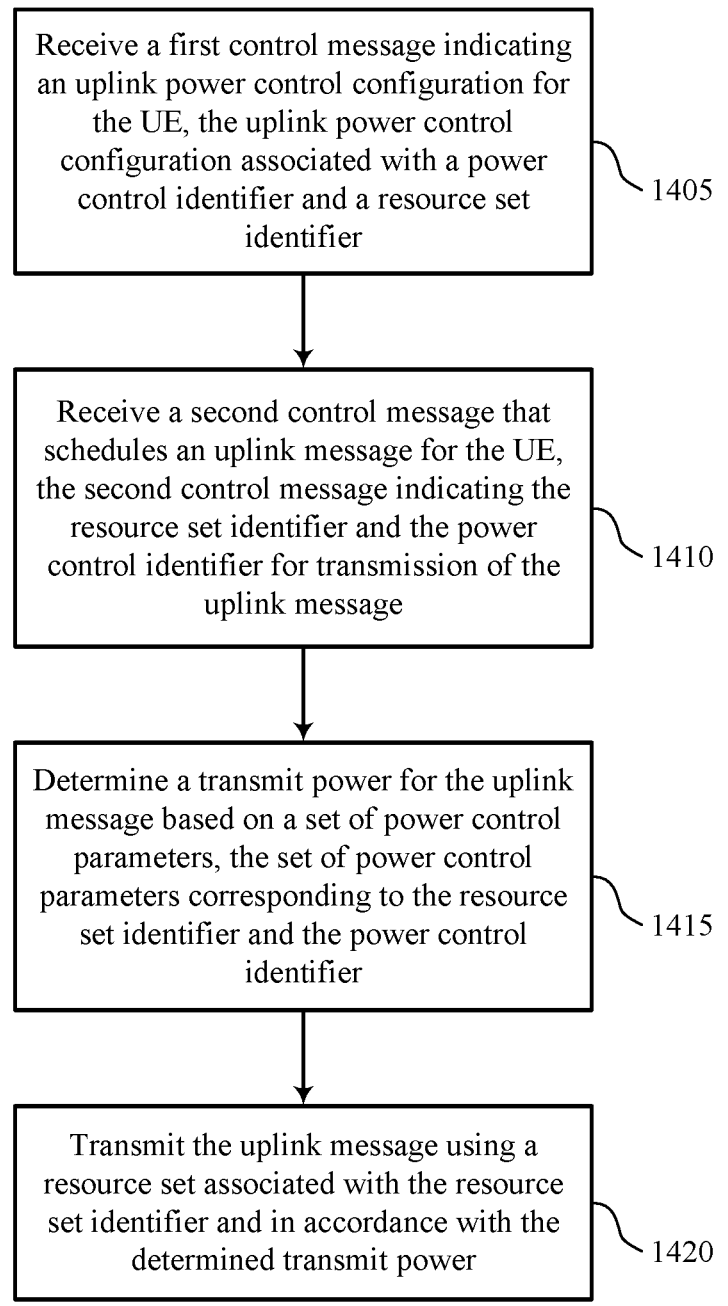
FIGS. 14 through 17 show flowcharts illustrating methods that support pathloss reference signal update for multiple beams in accordance with aspects of the present disclosure.

FIG. 14 shows a flowchart illustrating a method 1400 that supports pathloss reference signal update for multiple beams in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive a first control message indicating a set of uplink power control configurations for the UE, each uplink power control configuration associated with a power control identifier and a resource set identifier. The operations of 1405 may be performed according to the methods described herein. In some examples, aspects of the operations of 1405 may be performed by a power control manager as described with reference to FIGS. 6 through 9.

At 1410, the UE may receive a second control message that schedules an uplink message for the UE, the second control message indicating the resource set identifier and the power control identifier for transmission of the uplink message. The operations of 1410 may be performed according to the methods described herein. In some examples, aspects of the operations of 1410 may be performed by a control message manager as described with reference to FIGS. 6 through 9.

At 1415, the UE may determine a transmit power for the uplink message based on a set of power control parameters, the set of power control parameters corresponding to the resource set identifier and the power control identifier. The operations of 1415 may be performed according to the methods described herein. In some examples, aspects of the operations of 1415 may be performed by a transmit power manager as described with reference to FIGS. 6 through 9.

At 1420, the UE may transmit the uplink message using a resource set associated with the resource set identifier and in accordance with the determined transmit power. The operations of 1420 may be performed according to the methods described herein. In some examples, aspects of the operations of 1420 may be performed by an uplink message manager as described with reference to FIGS. 6 through 9.

Figure 15:
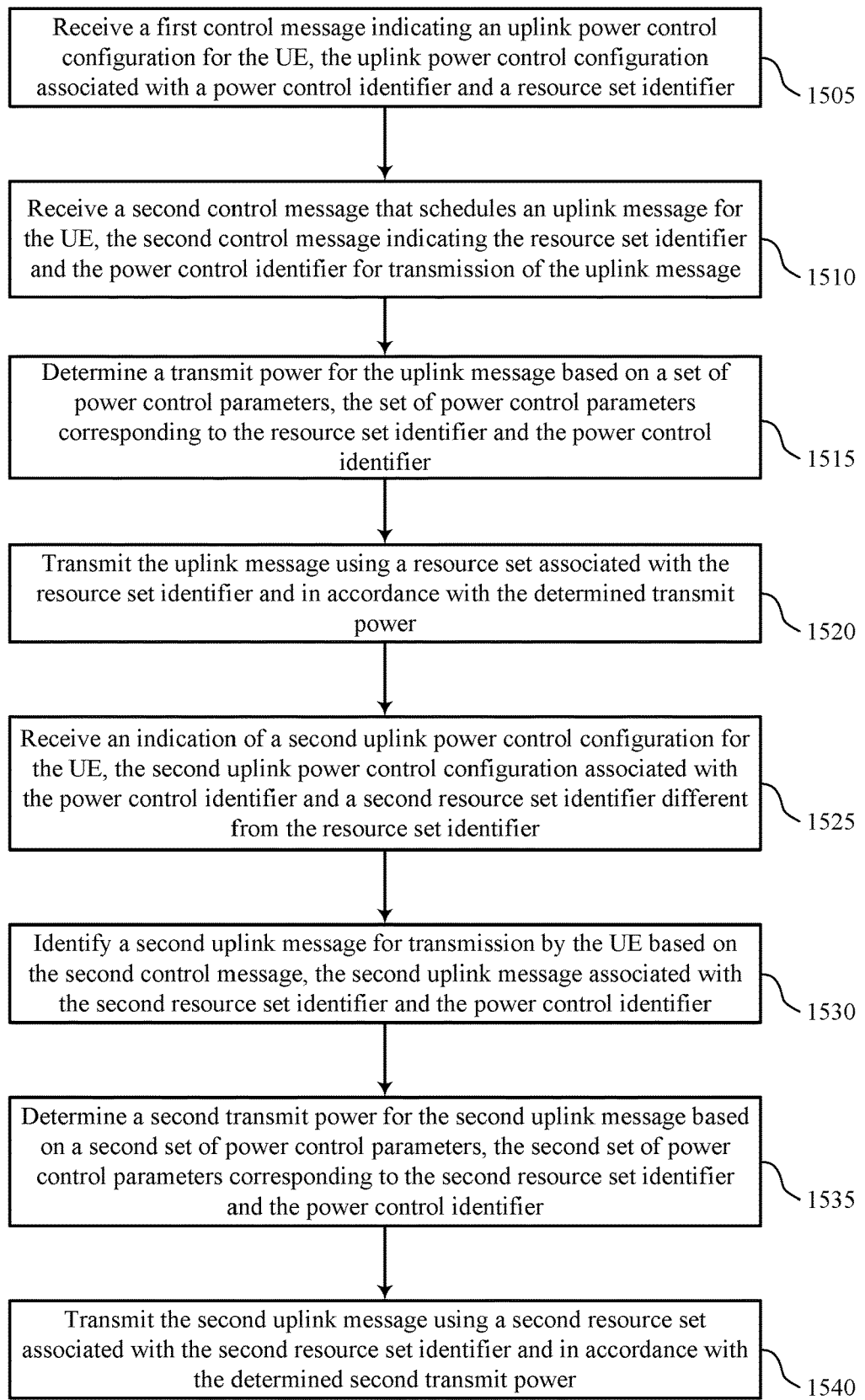

FIG. 15 shows a flowchart illustrating a method 1500 that supports pathloss reference signal update for multiple beams in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may receive a first control message indicating a set of uplink power control configurations for the UE, each uplink power control configuration associated with a power control identifier and a resource set identifier. The operations of 1505 may be performed according to the methods described herein. In some examples, aspects of the operations of 1505 may be performed by a power control manager as described with reference to FIGS. 6 through 9.

At 1510, the UE may receive a second control message that schedules an uplink message for the UE, the second control message indicating the resource set identifier and the power control identifier for transmission of the uplink message. The operations of 1510 may be performed according to the methods described herein. In some examples, aspects of the operations of 1510 may be performed by a control message manager as described with reference to FIGS. 6 through 9.

At 1515, the UE may determine a transmit power for the uplink message based on a set of power control parameters, the set of power control parameters corresponding to the resource set identifier and the power control identifier. The operations of 1515 may be performed according to the methods described herein. In some examples, aspects of the operations of 1515 may be performed by a transmit power manager as described with reference to FIGS. 6 through 9.

At 1520, the UE may transmit the uplink message using a resource set associated with the resource set identifier and in accordance with the determined transmit power. The operations of 1520 may be performed according to the methods described herein. In some examples, aspects of the operations of 1520 may be performed by an uplink message manager as described with reference to FIGS. 6 through 9.

At 1525, the UE may receive an indication of a second uplink power control configuration for the UE, the second uplink power control configuration associated with a second power control identifier and a second resource set identifier different from the resource set identifier. The operations of 1525 may be performed according to the methods described herein. In some examples, aspects of the operations of 1525 may be performed by a power control manager as described with reference to FIGS. 6 through 9.

At 1530, the UE may identify a second uplink message for transmission by the UE based on the second control message, the second uplink message associated with the second resource set identifier and the second power control identifier. The operations of 1530 may be performed according to the methods described herein. In some examples, aspects of the operations of 1530 may be performed by an uplink message manager as described with reference to FIGS. 6 through 9.

At 1535, the UE may determine a second transmit power for the second uplink message based on a second set of power control parameters, the second set of power control parameters corresponding to the second resource set identifier and the second power control identifier. The operations of 1535 may be performed according to the methods described herein. In some examples, aspects of the operations of 1535 may be performed by a transmit power manager as described with reference to FIGS. 6 through 9.

At 1540, the UE may transmit the second uplink message using a second resource set associated with the second resource set identifier and in accordance with the determined second transmit power. The operations of 1540 may be performed according to the methods described herein. In some examples, aspects of the operations of 1540 may be performed by an uplink message manager as described with reference to FIGS. 6 through 9.

Figure 16:
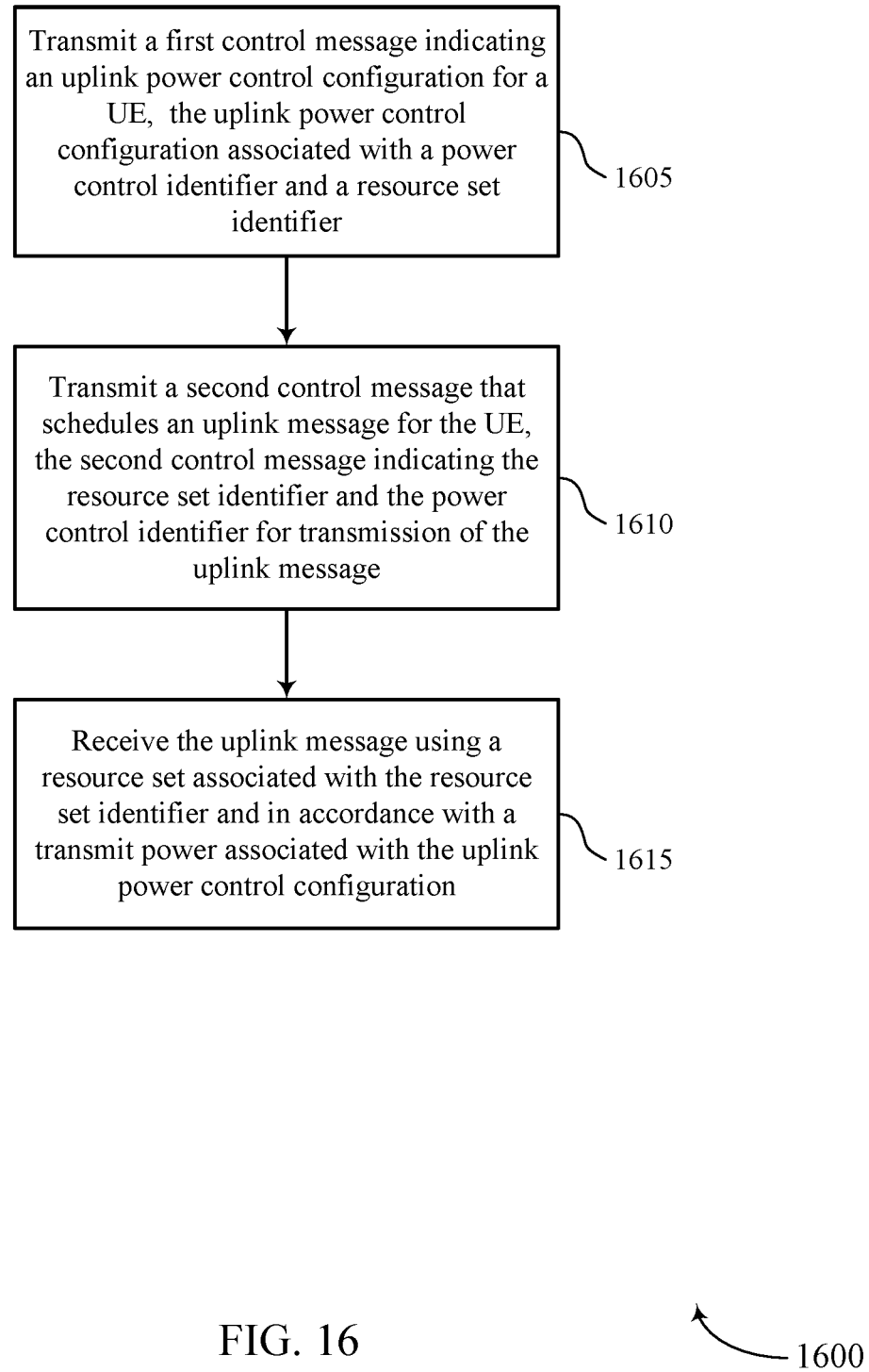

FIG. 16 shows a flowchart illustrating a method 1600 that supports pathloss reference signal update for multiple beams in accordance with aspects of the present disclosure. The operations of method 1600 may be implemented by a base station 105 or its components as described herein. For example, the operations of method 1600 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1605, the base station may transmit a first control message indicating an uplink power control configuration for a UE, the uplink power control configuration associated with a power control identifier and a resource set identifier. The operations of 1605 may be performed according to the methods described herein. In some examples, aspects of the operations of 1605 may be performed by a control message component as described with reference to FIGS. 10 through 13.

At 1610, the base station may transmit a second control message that schedules an uplink message for the UE, the second control message indicating the resource set identifier and the power control identifier for transmission of the uplink message. The operations of 1610 may be performed according to the methods described herein. In some examples, aspects of the operations of 1610 may be performed by a control message component as described with reference to FIGS. 10 through 13.

At 1615, the base station may receive the uplink message using a resource set associated with the resource set identifier and in accordance with a transmit power associated with the uplink power control configuration. The operations of 1615 may be performed according to the methods described herein. In some examples, aspects of the operations of 1615 may be performed by an uplink message component as described with reference to FIGS. 10 through 13.

Figure 17:
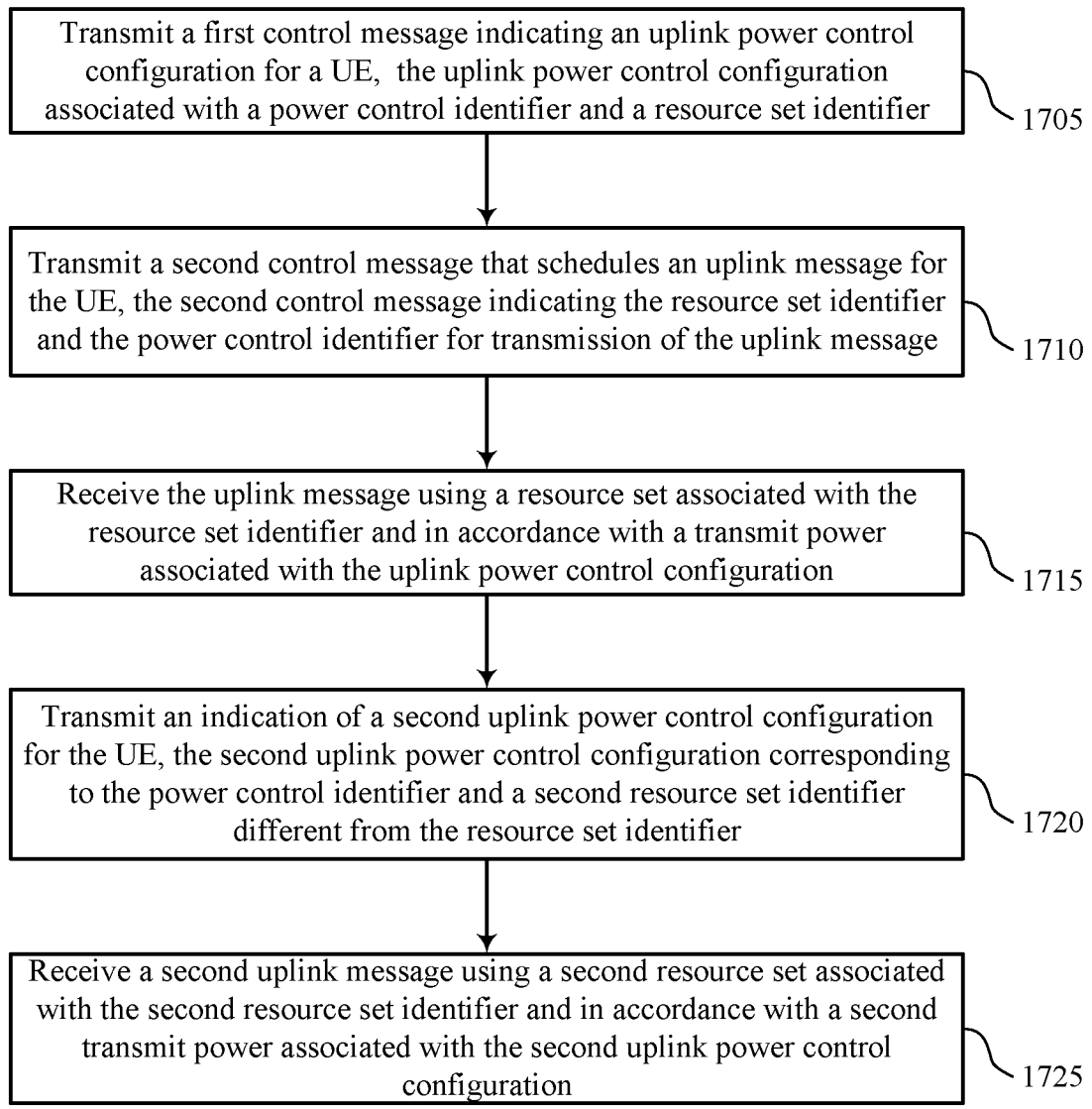

FIG. 17 shows a flowchart illustrating a method 1700 that supports pathloss reference signal update for multiple beams in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may transmit a first control message indicating an uplink power control configuration for a UE, the uplink power control configuration associated with a power control identifier and a resource set identifier. The operations of 1705 may be performed according to the methods described herein. In some examples, aspects of the operations of 1705 may be performed by a control message component as described with reference to FIGS. 10 through 13.

At 1710, the base station may transmit a second control message that schedules an uplink message for the UE, the second control message indicating the resource set identifier and the power control identifier for transmission of the uplink message. The operations of 1710 may be performed according to the methods described herein. In some examples, aspects of the operations of 1710 may be performed by a control message component as described with reference to FIGS. 10 through 13.

At 1715, the base station may receive the uplink message using a resource set associated with the resource set identifier and in accordance with a transmit power associated with the uplink power control configuration. The operations of 1715 may be performed according to the methods described herein. In some examples, aspects of the operations of 1715 may be performed by an uplink message component as described with reference to FIGS. 10 through 13.

At 1720, the base station may transmit an indication of a second uplink power control configuration for the UE, the second uplink power control configuration corresponding to the power control identifier and a second resource set identifier different from the resource set identifier. The operations of 1720 may be performed according to the methods described herein. In some examples, aspects of the operations of 1720 may be performed by a power control component as described with reference to FIGS. 10 through 13.

At 1725, the base station may receive a second uplink message using a second resource set associated with the second resource set identifier and in accordance with a second transmit power associated with the second uplink power control configuration. The operations of 1725 may be performed according to the methods described herein. In some examples, aspects of the operations of 1725 may be performed by an uplink message component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A user equipment (UE) for wireless communication, comprising:
   one or more memories storing processor-executable code; and
   one or more processors coupled with the one or more memories and individually or collectively operable to execute the code to cause the UE to:
   receive a control message that schedules a first uplink message and a second uplink message for the UE, the control message indicating a first resource in a first resource set for transmission of the first uplink message and indicating a second resource in a second resource set for transmission of the second uplink message;
   transmit the first uplink message using the first resource associated with a first resource set identifier, wherein a first transmit power of the first uplink message is based at least in part on a first set of power control parameters corresponding to both the first resource set identifier and a first power control identifier; and
   transmit the second uplink message using the second resource associated with a second resource set identifier, wherein a second transmit power of the second uplink message is based at least in part on a second set of power control parameters corresponding to both the second resource set identifier and a second power control identifier.

2. The UE of claim 1, wherein the control message further comprises a reference signal parameter, the one or more processors are individually or collectively further operable to execute the code to cause the UE to:
update the first and second resources and the first and second power control identifiers with the reference signal parameter; and
transmit, after updating the first and second resources and the first and second power control identifiers, the first and second uplink messages based at least in part on the reference signal parameter.

3. The UE of claim 2, wherein the one or more processors are individually or collectively further operable to execute the code to cause the UE to:
determine the first and second transmit powers based at least in part on the reference signal parameter.

4. The UE of claim 1, wherein the one or more processors are individually or collectively further operable to execute the code to cause the UE to:
transmit the first uplink message using a first set of time-frequency resources based at least in part on the first resource set identifier; and
transmit the second uplink message using a second set of time-frequency resources based at least in part on the second resource set identifier.

5. The UE of claim 4, wherein the first and second sets of time-frequency resources at least partially overlap in time or frequency.

6. The UE of claim 4, wherein the first and second sets of time-frequency resources are non-overlapping in time and frequency.

7. The UE of claim 1, wherein the one or more processors are individually or collectively further operable to execute the code to cause the UE to:
transmit the first uplink message during a first time period; and
transmit the second uplink message during a second time period that is different from the first time period.

8. The UE of claim 1, wherein the one or more processors are individually or collectively further operable to execute the code to cause the UE to:
transmit the first and second uplink messages on different sets of spatial layers.

9. The UE of claim 1, wherein the one or more processors are individually or collectively further operable to execute the code to cause the UE to:
determine a set of transmission parameters for the first and second uplink messages based at least in part on the first and second resources, wherein the set of transmission parameters comprises an uplink beam.

10. The UE of claim 1, wherein the control message further comprises a parameter identifier, the parameter identifier corresponding to a parameter of an uplink power control configuration for the UE, the one or more processors individually or collectively further operable to execute the code to cause the UE to:
transmit the first and second uplink messages in accordance with an updated parameter corresponding to the parameter of the uplink power control configuration.

11. The UE of claim 10, wherein the one or more processors are individually or collectively further operable to execute the code to cause the UE to:
update a pathloss reference signal parameter of the uplink power control configuration based at least in part on the parameter identifier corresponding to a pathloss reference signal identifier.

12. A network device for wireless communication, comprising:
one or more memories storing processor-executable code; and
one or more processors coupled with the one or more memories and individually or collectively operable to execute the code to cause the network device to:
transmit a control message that schedules a first uplink message and a second uplink message for a user equipment (UE), the control message indicating a first resource in a first resource set for transmission of the first uplink message and indicating a second resource in a second resource set for transmission of the second uplink message;
receive the first uplink message using the first resource associated with a first resource set identifier, wherein a first transmit power of the first uplink message is based at least in part on a first set of power control parameters corresponding to both the first resource set identifier and a first power control identifier; and
receive the second uplink message using the second resource associated with a second resource set identifier, wherein a second transmit power of the second uplink message is based at least in part on a second set of power control parameters corresponding to both the second resource set identifier and a second power control identifier.

13. The network device of claim 12, wherein the control message further comprises a parameter identifier, the parameter identifier corresponding to a parameter of an uplink power control configuration for the UE, the one or more processors individually or collectively further operable to execute the code to cause the network device to:
receive the first and second uplink messages in accordance with an updated parameter corresponding to the parameter of the uplink power control configuration.

14. The network device of claim 13, wherein, to transmit the control message, the one or more processors individually or collectively further operable to execute the code to cause the UE to:
transmit the control message via a medium access control (MAC) control element (MAC-CE).

15. A method for wireless communication at a user equipment (UE), comprising:
receiving a control message that schedules a first uplink message and a second uplink message for the UE, the control message indicating a first resource in a first resource set for transmission of the first uplink message and indicating a second resource in a second resource set for transmission of the second uplink message;
transmitting the first uplink message using the first resource associated with a first resource set identifier, wherein a first transmit power of the first uplink message is based at least in part on a first set of power control parameters corresponding to both the first resource set identifier and a first power control identifier; and
transmitting the second uplink message using the second resource associated with a second resource set identifier, wherein a second transmit power of the second uplink message is based at least in part on a second set of power control parameters corresponding to both the second resource set identifier and a second power control identifier.

16. The method of claim 15, wherein the control message further comprises a reference signal parameter, the method further comprising:
updating the first and second resource sets and the first and second power control identifiers with the reference signal parameter; and
transmitting, after updating the first and second resource sets and the first and second power control identifiers, the first and second uplink messages based at least in part on the reference signal parameter.

17. The method of claim 16, further comprising:
determining the first and second transmit powers based at least in part on the reference signal parameter.

18. The method of claim 15, further comprising:
transmitting the first uplink message using a first set of time-frequency resources based at least in part on the first resource set identifier; and
transmitting the second uplink message using a second set of time-frequency resources based at least in part on the second resource set identifier.

19. The method of claim 18, wherein the first and second sets of time-frequency resources at least partially overlap in time or frequency.

20. The method of claim 18, wherein the first and second sets of time-frequency resources are non-overlapping in time and frequency.

21. The method of claim 15, further comprising:
transmitting the first uplink message during a first time period; and
transmitting the second uplink message during a second time period that is different from the first time period.

22. The method of claim 15, further comprising:
transmitting the first and second uplink messages on different sets of spatial layers.

23. The method of claim 15, further comprising:
determining a set of transmission parameters for the first and second uplink message based at least in part on the first and second resource sets, wherein the set of transmission parameters comprises an uplink beam.

24. The method of claim 15, wherein the control message further comprises a parameter identifier, the parameter identifier corresponding to a parameter of an uplink power control configuration for the UE, the method further comprising:

transmitting the first and second uplink messages in accordance with an updated parameter corresponding to the parameter of the uplink power control configuration.

25. The method of claim 24, further comprising:
updating a pathloss reference signal parameter of the uplink power control configuration based at least in part on the parameter identifier corresponding to a pathloss reference signal identifier.

26. A method for wireless communications at a network device, comprising:
transmitting a control message that schedules a first uplink message and a second uplink message for a user equipment (UE), the control message indicating a first resource in a first resource set for transmission of the first uplink message and indicating a second resource in a second resource set for transmission of the second uplink message;
receiving the first uplink message using the first resource associated with a first resource set identifier, wherein a first transmit power of the first uplink message is based at least in part on a first set of power control parameters corresponding to both the first resource set identifier and a first power control identifier; and
receiving the second uplink message using the second resource associated with a second resource set identifier, wherein a second transmit power of the second uplink message is based at least in part on a second set of power control parameters corresponding to both the second resource set identifier and a second power control identifier.

27. The method of claim 26, wherein the control message further comprises a parameter identifier, the parameter identifier corresponding to a parameter of an uplink power control configuration for the UE, the method further comprising:
receiving the first and second uplink messages in accordance with an updated parameter corresponding to the parameter of the uplink power control configuration.

28. The method of claim 27, wherein transmitting the control message comprises:
transmitting the control message via a medium access control (MAC) control element (MAC-CE).

* * * * *